US011390293B2

(12) United States Patent
Ono et al.

(10) Patent No.: US 11,390,293 B2
(45) Date of Patent: Jul. 19, 2022

(54) DISPLAY DEVICE FOR DISPLAYING A SYSTEM CONFIDENCE LEVEL OF AN AUTOMATIC DRIVE CONTROL

(71) Applicant: Toyota Jidosha Kabushiki Kaisha, Toyota (JP)

(72) Inventors: Sayaka Ono, Mishima (JP); Yoshitaka Fuwamoto, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 138 days.

(21) Appl. No.: 16/527,601

(22) Filed: Jul. 31, 2019

(65) Prior Publication Data
US 2020/0114933 A1 Apr. 16, 2020

(30) Foreign Application Priority Data

Oct. 16, 2018 (JP) .............................. JP2018-195228

(51) Int. Cl.
*B60W 50/14* (2020.01)
*G05D 1/00* (2006.01)
*B60W 30/18* (2012.01)
*B60K 37/02* (2006.01)

(52) U.S. Cl.
CPC ............ *B60W 50/14* (2013.01); *B60K 37/02* (2013.01); *B60W 30/18009* (2013.01); *G05D 1/0038* (2013.01); *B60K 2370/1529* (2019.05); *B60Y 2200/11* (2013.01)

(58) Field of Classification Search
CPC ...... B60K 2370/1529; B60K 2370/179; B60K 35/00; B60K 37/02; B60W 30/18009; B60W 50/14; B60Y 2200/11; G05D 1/0038
See application file for complete search history.

(56) References Cited

U.S. PATENT DOCUMENTS

| 2016/0195407 | A1* | 7/2016 | Sasaki ................... G08G 1/167 701/36 |
| 2017/0261982 | A1 | 9/2017 | Otaki et al. |
| 2017/0336629 | A1 | 11/2017 | Suzuki et al. |
| 2019/0064531 | A1* | 2/2019 | Wakatsuki ............... G09G 5/38 |
| 2019/0248287 | A1 | 8/2019 | Ono et al. |
| 2019/0263263 | A1 | 8/2019 | Shimotani et al. |
| 2020/0041997 | A1* | 2/2020 | Tuukkanen ....... B60W 30/0956 |

FOREIGN PATENT DOCUMENTS

| JP | H08178679 A | 7/1996 |
| JP | H10105885 A | 4/1998 |
| JP | 2005-346177 A | 12/2005 |

(Continued)

Primary Examiner — Afroza Chowdhury
(74) Attorney, Agent, or Firm — Dinsmore & Shohl LLP

(57) ABSTRACT

A display device includes an electronic control unit configured to: obtain a traveling plan from an automatic driving system of a vehicle, the traveling plan including a course of the vehicle under automatic drive control of the automatic driving system; obtain, from the automatic driving system, a system confidence level of the automatic drive control calculated based on at least an external environment around the vehicle; and display, on a display, a pointer as an image indicating the course during the automatic drive control in a display mode set based on the system confidence level.

16 Claims, 9 Drawing Sheets

(56) References Cited

FOREIGN PATENT DOCUMENTS

| | | |
|---|---|---|
| JP | 2007230454 A | 9/2007 |
| JP | 2007-333502 A | 12/2007 |
| JP | 2008-070998 A | 3/2008 |
| JP | 2008158969 A | 7/2008 |
| JP | 2017-004210 A | 1/2017 |
| JP | 2017126287 A | 7/2017 |
| JP | 2017162406 A | 9/2017 |
| JP | 2017-211366 A | 11/2017 |
| JP | 2019-138773 A | 8/2019 |
| WO | 2018/078732 A1 | 5/2018 |

* cited by examiner

DISPLAY DEVICE FOR DISPLAYING A SYSTEM CONFIDENCE LEVEL OF AN AUTOMATIC DRIVE CONTROL

CROSS-REFERENCE TO RELATED APPLICATION

This application claims priority to Japanese Patent Application No. 2018-195228 filed on Oct. 16, 2018, which is incorporated herein by reference in its entirety.

BACKGROUND

1. Technical Field

The disclosure relates to a display device.

2. Description of Related Art

As an example the related art, a system shown in Japanese Unexamined Patent Application Publication No. 2017-126287 (JP 2017-126287 A) displays a course (predicted traveling pathway) of a vehicle on a front windshield of the vehicle, by means of head-up display (HUD) installed on the vehicle, so as to enable the driver to recognize the course of the vehicle.

SUMMARY

When the vehicle operates under automatic drive control, the possibility of continuing the automatic drive control may change depending on the external environment of the vehicle, etc., and the driver may be required to intervene in driving when it is difficult to continue the automatic drive control. Therefore, it is desirable to provide display concerning the possibility of continuing automatic drive control, such that the driver can intuitively grasp the possibility.

A display device according to one aspect of the disclosure includes: an onboard display; and an electronic control unit configured to obtain a traveling plan from an automatic driving system of a vehicle, the traveling plan including a course of the vehicle under automatic drive control of the automatic driving system, obtain, from the automatic driving system, a system confidence level of the automatic drive control calculated based on at least an external environment around the vehicle, and display, on the onboard display, a pointer as an image indicating the course during the automatic drive control in a display mode set based on the system confidence level.

According to the above aspect of the disclosure, it is possible to provide display that enables the driver to intuitively grasp the possibility of continuing automatic drive control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

One embodiment of the disclosure will be described with reference to the drawings.

Figure 1:
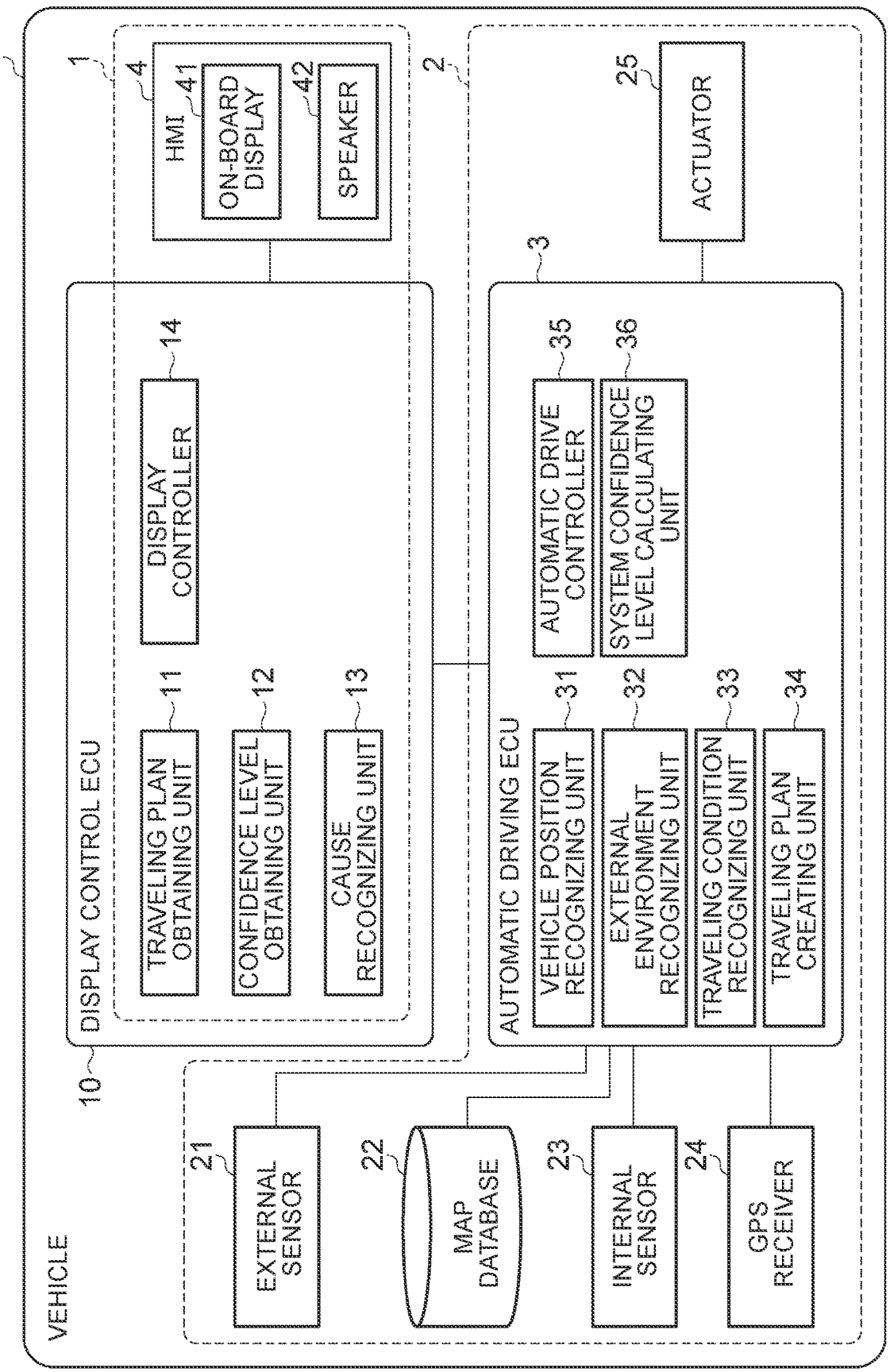
FIG. 1 is a block diagram showing a display device according to one embodiment and an automatic driving system.

FIG. 1 is a block diagram showing a display device according to this embodiment and an automatic driving system. As shown in FIG. 1, the display device 1 and the automatic driving system 2 are installed on a vehicle V, such as a passenger car.

Configuration of Automatic Driving System

Initially, the configuration of the automatic driving system 2 will be described. The automatic driving system 2 is a system that performs automatic drive control on the vehicle V. The automatic drive control is vehicle control under which the vehicle V automatically travels along a road on which the vehicle V is traveling, without requiring the driver to perform driving operation. The automatic driving system 2 starts automatic drive control of the vehicle V, when the driver performs operation to start automatic drive control (for example, when the driver pushes a start button for automatic drive control). When the driver intervenes in driving operation, during automatic drive control, the automatic driving system 2 cancels automatic drive control at least temporarily, and shifts to a manual driving mode (override condition). When the driver performs returning operation (for example, when the driver pushes a return button for automatic drive control, or pushes the start button for automatic drive control) while the automatic driving system 2 is placed in the override condition, the automatic driving system 2 cancels the override condition, and shifts (returns) to automatic drive control.

The automatic driving system 2 includes an automatic driving electronic control unit (ECU) 3, one or more external sensors 21, map database 22, one or more internal sensors 23, GPS (Global Positioning System) receiver 24, and actuators 25.

The external sensors 21 are detectors that detect objects around the vehicle V. The objects include stationary objects, such as guardrails, power poles, and parked vehicles, and moving objects, such as other vehicles, and pedestrians. The external sensors 21 include at least one of cameras and radar sensors. The camera is an imaging device that takes an image of the surroundings of the vehicle (at least those in front of the vehicle). The camera sends image information on the surroundings of the vehicle, to the automatic driving ECU 3. The camera may be a monocular camera, or a stereo camera. The radar sensor is a detection device that detects an object in the vicinity of the vehicle, using radio waves (such as millimeter waves) or light. The radar sensor includes a millimeter-wave radar or LIDAR (Light Detection and Ranging), for example. The radar sensor detects an object, by sending radio waves or light to the surroundings of the own vehicle, and receiving the radio waves or light reflected by the object. The radar sensor sends information about the detected object, to the automatic driving ECU 3. The external sensor 21 is also used for recognizing white lines that define a traveling lane on which the vehicle V is traveling.

The map database 22 is a database having map information. The map database 22 is stored in a storage unit installed on the vehicle V. The map information includes road position information, road shape information (such as curves, types of straight parts, and curvature of each curve), information on positions of intersections and crossroads, information on positions of buildings, and so forth. The map information may also include information on positions of pedestrian crossings, and information on positions of stop lines. The map information also includes information on positions of targets. The target is an object of which the position on a map is known, and which is used as a benchmark for recognition of the position of the vehicle on the map. The targets may include a road sign, such as a stop line, power pole, road demarcation line, traffic light, and so forth. The map database 22 may be stored in a computer of a facility, such as an information processing sensor, which can communicate with the vehicle V. The information on the positions of the targets may be stored in a database that is different from the map database.

The internal sensors 23 are detectors that detect traveling conditions of the vehicle V and driving operation of the driver of the vehicle V. The internal sensors 23 include at least one of a vehicle speed sensor, acceleration sensor, and yaw rate sensor, for detection of traveling conditions of the vehicle V.

The vehicle speed sensor is a detector that detects the speed of the vehicle V. A vehicle wheel speed sensor, which is used as one example of the vehicle speed sensor, is provided on a wheel of the vehicle V, or a driveshaft, or the like, that rotates as a unit with the wheel, and detects the rotational speed of the wheel. The vehicle speed sensor sends information on the detected vehicle speed of the vehicle V to the automatic driving ECU 3. The acceleration sensor is a detector that detects the acceleration of the vehicle V. The acceleration sensor includes a longitudinal acceleration sensor that detects the acceleration of the vehicle V in the longitudinal direction, and a lateral acceleration sensor that detects the lateral acceleration of the vehicle V. The acceleration sensor sends information on the detected acceleration of the vehicle V, to the automatic driving ECU 3. The yaw rate sensor is a detector that detects the yaw rate (rotation angular velocity) about the vertical axis passing the center of gravity of the vehicle V. A gyro sensor is used as one example of the yaw rate sensor. The yaw rate sensor sends information on the detected yaw rate of the vehicle V, to the automatic driving ECU 3.

The GPS receiver 24 receives signals from three or more GPS satellites, so as to measure the position of the vehicle V. In one specific example, the position is represented by latitude and longitude. The GPS receiver 24 sends information on the measured position of the vehicle V to the automatic driving ECU 3.

The actuators 2.5 are devices that perform traveling control on the vehicle V. The actuators 25 include an engine actuator, brake actuator, and steering actuator. The engine actuator changes the amount of air supplied to the engine, according to a control signal from the automatic driving ECU 3, so as to control driving force of the vehicle V. As one specific example, the engine actuator controls the driving force of the vehicle V by changing the throttle opening. In the case where the vehicle V is a hybrid vehicle or an electric vehicle, the engine actuator controls driving force of a motor as a power source. The brake actuator controls a brake system, according to a control signal from the automatic driving ECU 3, and controls braking force applied to the wheels of the vehicle V. A hydraulic brake system may be used as the brake system. The steering actuator controls driving of an assist motor that controls steering torque, in an electric power steering system, according to a control signal from the automatic driving ECU 3. In this manner, the steering actuator controls steering, torque of the vehicle V.

The automatic driving ECU 3 is an electronic control unit having a central processing unit (CPU), read-only memory (ROM), random access memory (RAM), controller area network (CAN) communication circuit, and so forth. The automatic driving ECU 3 controls the hardware based on signals generated from the CPU, and implements various functions that will be described later.

The automatic driving ECU 3 has a vehicle position recognizing unit 31, external environment recognizing unit 32, traveling condition recognizing, unit 33, traveling plan creating unit 34, automatic drive controller 35, and system confidence level calculating unit 36.

The vehicle position recognizing unit 31 recognizes a position of the vehicle V on a map, based on position information of the GPS receiver 24 and map information of the map database 22. Also, the vehicle position recognizing unit 31 recognizes the position of the vehicle V according to a simultaneous localization and mapping (SLAM) technology, utilizing the information on the positions of targets, such as power poles, included in the map information of the map database 22, and detection results of the external sensors 21. The vehicle position recognizing unit 31 may recognize the position of the vehicle V on the map, according to any other known method.

The external environment recognizing unit 32 recognizes the ambient surroundings of the vehicle V, based on detection results of the external sensors 21. The external environment includes the position of each object relative to the vehicle V, velocity of the object relative to the vehicle V, direction of movement of the object relative to the vehicle V, and so forth. The external environment recognizing unit 32 may recognize moving objects, such as another vehicle, and stationary objects, such as a power pole, while distinguishing them from each other. The external environment recognizing unit 32 may distinguish and recognize the types (such as vehicles, and pedestrians) of objects, according to template matching, or other methods, for example. The external environment may also include the shape of a road recognized through white line recognition processing from detection results of the external sensors 21. The external environment may also include the result of recognition of a traffic light located ahead of the vehicle, using an image captured by a camera.

The traveling condition recognizing unit 33 recognizes traveling conditions of the vehicle V, based on detection results of the internal sensors 23. The traveling conditions include the vehicle speed of the vehicle V, acceleration of the vehicle V, and yaw rate of the vehicle V. More specifically, the traveling condition recognizing unit 33 recognizes the vehicle speed of the vehicle V, based on vehicle speed information received from the vehicle speed sensor. The traveling condition recognizing unit 33 recognizes the acceleration of the vehicle V, based on acceleration information received from the acceleration sensor. The traveling condition recognizing unit 33 recognizes the orientation of the vehicle V, based on yaw rate information received from the yaw rate sensor.

The traveling plan creating unit 34 creates a traveling plan of the vehicle V, based on a destination that is set in advance, the map information of the map database 22, position of the vehicle V on the map recognized by the vehicle position recognizing unit 31, external environment of the vehicle V recognized by the external environment recognizing unit 32, and traveling conditions of the vehicle V recognized by the traveling condition recognizing unit 33. The destination may be a destination set by an occupant, such as the driver, or may be a destination proposed by the automatic driving system 2.

The traveling plan includes a course of the vehicle V. The course of the vehicle V is a future traveling pathway along which the vehicle V will travel under automatic drive control. The traveling plan creating unit 34 calculates a target route (pathway in units of traffic lane) of the vehicle V to the destination, based on the destination, the current position of the vehicle V on the map, and the map information. The target route of the vehicle V may also be obtained by a known navigation system or a server outside the vehicle.

The traveling plan creating unit 34 calculates the course of the vehicle V along which the vehicle V actually travels, based on the target route of the vehicle V, the external environment of the vehicle V, and the traveling conditions of the vehicle V. For example, the course of the vehicle V is calculated so as to pass a middle position of the lane (as viewed in the lane width direction) on the traveling pathway of the vehicle. When a lane change is needed so as to direct the vehicle V toward the destination, the course of the vehicle V is calculated so as to extend from the middle position of the lane on which the vehicle V is traveling, over a demarcation line, and reach a middle position of an adjacent lane to which the lane is changed, for example. When a small fallen object exists in front of the vehicle V, for example, the course of the vehicle V is calculated so as to avoid the fallen object within the traveling lane.

The traveling plan creating unit 34 calculates a speed pattern (speed plan) for traveling along the course of the vehicle V, after calculation of the course of the vehicle V. The traveling plan creating unit 34 calculates the speed pattern of the vehicle V, based on a permissible speed under automatic drive control, which is set by the occupant, set speeds (e.g., legal speed limits) included in the map information, stop lines included in the map information, position information on traffic lights, etc., external environment, such as a preceding vehicle, and pedestrians. The traveling plan creating unit 34 creates the traveling plan including the course of the vehicle V and the speed pattern, by calculating the course of the vehicle V and the speed pattern. The traveling plan is not limited to the content as described above, but may be any traveling plan provided that it includes the course of the vehicle V used for the automatic drive control.

The automatic drive controller 35 performs automatic drive control on the vehicle V, based on the traveling plan created by the traveling plan creating unit 34. The automatic drive controller 35 sends control signals to the actuators 25, so as to control the vehicle speed and steering angle of the vehicle V, for execution of the automatic drive control.

The system confidence level calculating unit 36 calculates the system confidence level of the automatic drive control. The system confidence level is an index indicating the reliability of automatic drive control. The system confidence level corresponds to the possibility of continuing automatic drive control. The automatic driving system 2 finishes automatic drive control when the system confidence level becomes lower than an end threshold value, for example, and switches the vehicle to a driving mode in which the vehicle is mainly operated by the driver. The driving mode in which the vehicle is mainly operated by the driver includes manual driving (completely manual driving) by the driver, and driving by the driver, which is assisted by driving assist control, such as adaptive cruise control (ACC), and lane keeping assist (LKA). The end threshold value is a threshold value that is set in advance, in the following, threshold values used in the description mean threshold values set in advance.

The system confidence level calculating unit 36 calculates the system confidence level, based on the external environment of the vehicle V obtained by the external environment recognizing unit 32. The system confidence level calculating unit 36 can calculate the system confidence level, in view of an influence of dynamic disturbance from the surroundings of the vehicle V that performs automatic drive control, for example.

More specifically, when the number of moving objects, such as other vehicles, around the vehicle V is equal to or larger than a given value, the system confidence level calculated by the system confidence level calculating unit 36 may be a lower value than that in the case where the number of moving objects around the vehicle V is smaller than the given value. When a preceding vehicle exists ahead of the vehicle V within a given distance from the vehicle V, the system confidence level calculated by the system confidence level calculating unit 36 may be a lower value than that in the case where no preceding vehicle exists.

When a preceding vehicle exists ahead of the vehicle V within a given distance from the vehicle V, the system confidence level calculated by the system confidence level calculating unit 36 may be a lower value, as the inter-vehicle distance between the vehicle V and the preceding vehicle is shorten. When a following car exists behind the vehicle V within a given distance from the vehicle V, the system confidence level calculated by the system confidence level calculating unit 36 may be a lower value than that in the case where no following vehicle exists. When there is a vehicle traveling side by side with the vehicle V, the system confidence level calculated by the system confidence level calculating unit 36 may be a lower value than that in the case where there is no vehicle traveling side by side.

When an object of which the time to collision (TTC) is shorter than a TTC threshold value exists ahead of the vehicle V, the system confidence level calculated by the system confidence level calculating unit 36 may be a lower value than that in the case where no object of which the time to collision is shorter than the TTC threshold value exists ahead of the vehicle V. In this connection, the inter-vehicle time may be used, in place of the time to collision.

When there is a pedestrian within a given distance from the vehicle V in the traveling direction of the vehicle V, the system confidence level calculated by the system confidence level calculating unit 36 may be a lower value than that in the case where there is no pedestrian. When there is a pedestrian who is moving in such a direction as to cross the course of the vehicle V, the system confidence level calculated by the system confidence level calculating unit 36 may be a lower value than that in the case where there is no such pedestrian. This also applies to the case of a bicycle, personal mobility vehicle, or the like, rather than the pedestrian.

When another vehicle around the vehicle V is performing abnormal behavior, the system confidence level calculated by the system confidence level calculating unit 36 may be a lower value than that in the case where another vehicle is not performing abnormal behavior. The abnormal behavior is such that is not supposed or scheduled to be performed by another vehicle, under a standard traveling situation. The abnormal behavior may include rapid deceleration, rapid acceleration, rapid steering, turn-on of a hazard lamp, and so forth. The system confidence level calculating unit 36 may recognize abnormal behavior, when the behavior performed by another vehicle around the vehicle V deviates from preset normal behavior. The normal behavior may include traveling along a traffic lane at a speed equal to or lower than the legal speed limit set for the lane, at an acceleration or deceleration that is equal to or smaller than its threshold value, for example. The case where the behavior of the vehicle V deviates from normal behavior may include the case where the vehicle V is traveling in a condition where its vehicle body strays from the lane on which the vehicle V was traveling.

When the rate of shielding in a detection range of the external sensor 21 by a building, another vehicle, or the like, is equal to or larger than a shielding threshold value, the system confidence level calculated by the system confidence level calculating unit 36 may he a lower value than that in the case where the shielding rate in the detection range of the external sensor 21 is smaller than the shielding threshold value. The system confidence level calculating unit 36 may recognize a target included in the detection range of the external sensor 21 on the map, based on the position of the vehicle V on the map and target position information included in the map information, and check it against an object (stationary object) recognized by the external environment recognizing unit 32. When a difference obtained by subtracting the number of targets recognized by the external environment recognizing unit 32 from the number of targets included in the detection range of the external sensor 21 on the map is equal to or larger than a difference threshold value, the system confidence level calculated by the system confidence level calculating unit 36 may be a lower value than that in the case where the difference is smaller than the difference threshold value. The system confidence level calculating unit 36 may recognize the number of targets included in the detection range of the external sensor 21 on the map, in view of shielding in the detection range of the external sensor 21 by a building, or the like.

The system confidence level calculating unit 36 may calculate the system confidence level, based on a tracking condition of a moving object, such as another vehicle, as a part of the external environment of the vehicle V. When a moving object tracked in the detection range of the external sensor 21 is lost, the system confidence level calculated by the system confidence level calculating unit 36 may be a lower value than that in the case where the moving object is not lost. When the shape or volume of a moving object that is being tracked changes by a given percentage or more, a possibility that two or more objects are erroneously recognized as a single moving object is increased; therefore, the system confidence level calculated by the system confidence level calculating unit 36 may be a lower value than that in the case where the shape or volume of the moving object is not changed. When the relative velocity of a moving object that is being tracked is rapidly changed, a possibility that two or more objects moving at different velocities are erroneously recognized as a single object is increased; therefore, the system confidence level calculated by the system confidence level calculating unit 36 may be a lower value than that in the case where the relative velocity of the moving object is not rapidly changed. For example, the system confidence level calculating unit 36 can recognize rapid change of the relative velocity when a change in the velocity within a given period of time is equal to or larger than a rapid-change threshold value.

When a result of recognition of a traffic light ahead of the vehicle is included in the external environment of the vehicle V, and the shape of the traffic light thus recognized does not coincide with the shape of a corresponding traffic light stored in the map information (for example, when the traffic light recognized has three lamps plus an arrow lamp, whereas the traffic light in the map information is of a three-lamp type having three lamps), the system confidence level calculated by the system confidence level calculating unit 36 may be a lower value than that in the case where the shape of the traffic light recognized coincides with the shape of the traffic light stored in the map information. Not only the shape of the traffic light but also the dimensions of the traffic light may be taken into consideration. Also, the shape or dimensions of a target other than the traffic light may be used. The arrow lamp of the traffic light is recognized with some delay as compared with normal lamps; thus, when the traffic light includes an arrow lamp, and the distance from the vehicle V is equal to or larger than a given distance, the system confidence level calculated by the system confidence level calculating unit 36 may be a lower value than that in the case where the traffic light does not include any arrow lamp.

When the external environment of the vehicle V includes the weather around the vehicle V, and the weather around the vehicle V is rainy weather, the system confidence level calculated by the system confidence level calculating unit 36 may be a lower value than that in the case where the weather around the vehicle V is clear weather. The weather around the vehicle V may be determined based on image information captured by a camera or a detection result of a radar sensor. The weather around the vehicle V may also be determined based on operating conditions of wipers of the vehicle V.

The system confidence level calculating unit 36 may calculate the system confidence level, based on the degree of interference of a moving object with the course of the vehicle V. The degree of interference of the moving object with the course of the vehicle V may be calculated, using a method described in Japanese Unexamined Patent Application Publication No. 2007-230454 (JP 2007-230454 A), for example. The system confidence level calculated by the system confidence level calculating unit 36 may be a lower value, as the degree of interference of the moving object with the course of the vehicle V is larger, for example.

The system confidence level calculating unit 36 may calculate the system confidence level, based on a level of danger of a moving object around the vehicle V. The level of danger of the moving object around the vehicle may be calculated, using a method described in Japanese Unexamined Patent Application Publication No. 2008-158969 (JP 2008-158969 A), for example. The system confidence level calculated by the system confidence level calculating unit 36 may be a lower value, as the level of danger of the moving object against the course of the vehicle V is higher, for example.

The system confidence level calculating, unit 36 may calculate the system confidence level, based on the position of the vehicle V on the map, which is obtained by the vehicle position recognizing unit 31. When the position of the vehicle V is recognized, using a target in addition to position information from the GPS receiver 24, for example, the system confidence level calculated by the system confidence level calculating unit 36 may be a lower value than that in the case where the position of the vehicle V is recognized, using only the position information from the GPS receiver 24.

When the vehicle V is located in a region where the accuracy of map information is low, the system confidence level calculated by the system confidence level calculating unit 36 may be a lower value than that in the case where the vehicle V is located in other regions. The information as to whether the accuracy of the map information is low in the region in question is associated in advance with the map information, for example. When the number of the GPS satellites from which the GPS receiver 24 receives signals is equal to or larger than a given value, the system confidence level calculated by the system confidence level calculating unit 36 may be a lower value than that in the case where the number of GPS satellites is smaller than the given value. When the GPS satellites from which the GPS receiver 24 receives signals are located dispersedly, the system confidence level calculated by the system confidence level calculating unit 36 may be a lower value than that in the case where the GPS satellites are located in a concentrated fashion.

When the number of recognized targets located around the vehicle V is smaller than a given value, the system confidence level calculated by the system confidence level calculating unit 36 may be a lower value than that in the case where the number of recognized targets is equal to or larger than the given value. When the positional relationship of two or more targets recognized around the vehicle V is not identical with the positional relationship of the corresponding targets in the map information, the system confidence level calculated by the system confidence level calculating unit 36 may be a lower value than that in the case where the positional relationship of the recognized two or more targets is identical with that of the corresponding targets in the map information. When the positional relationship of two or more targets recognized is not identical with the positional relationship of the corresponding targets in the map information, and the average of position errors of the respective targets is smaller than a given distance, the system confidence level calculated by the system confidence level calculating unit 36 may be a lower value than that in the case where the average of position errors of the respective targets is equal to or larger than the given distance. A median value, or a total value, may be used in place of the average.

When the vehicle V is located in complicated road circumstances including an intersection, rail crossing, road merging region, road branching region, etc., the system confidence level calculated by the system confidence level calculating unit 36 may be a lower value than that in the case where the vehicle V is not located in such complicated road circumstances. When the vehicle V is located in a poor visibility region set in advance in map information, the system confidence level calculated by the system confidence level calculating unit 36 may be a lower value than that in the case where the vehicle V is not located in the poor visibility region.

The system confidence level calculating unit 36 may calculate the system confidence level, based on traveling conditions of the vehicle V obtained by the traveling condition recognizing unit 33. When an abnormal, value is obtained as a detection result of the vehicle speed of the vehicle V, the system confidence level calculated by the system confidence level calculating unit 36 may be a lower value than that in the case where no abnormal value is obtained as the detection result of the vehicle speed. The system confidence level calculating unit 36 recognizes the detection result as an abnormal value, when a difference between the vehicle speed detected one frame before the present time and the vehicle speed detected at this time is equal to or larger than an abnormality detection threshold value (e.g., 20 km/h or more). This manner of calculation may also be applied to other traveling conditions, such as the acceleration, yaw rate, etc.

The system confidence level calculating unit 36 may calculate the system confidence level, from the result of comparison between a traveling condition of the vehicle V scheduled in the traveling plan and a traveling condition of the vehicle V recognized as a result of execution of automatic drive control, based on the traveling condition of the vehicle V obtained by the traveling condition recognizing unit 33 and the traveling plan created by the traveling plan creating unit 34. For example, when a deviation of the history of the vehicle speed as a result of automatic drive control from that of the vehicle speed scheduled in the traveling plan is equal to or larger than a deviation threshold value, the system confidence level calculated by the system confidence level calculating unit 36 may be a lower vale than that in the case where the deviation is smaller than the deviation threshold value. This manner of calculation may also be applied to other traveling conditions, such as the acceleration, yaw rate, etc.

When an abnormality is detected in any of various sensors (external sensors, internal sensors, etc.) of the vehicle V, the system confidence level calculated by the system confidence level calculating unit 36 may be a lower value than that in the case where the sensors are in normal operation. A known abnormality detection technology may be used for sensor abnormality detection.

The system confidence level calculating unit 36 calculates (predicts) the system confidence level corresponding to a position (future position) of the vehicle V on the course. The position of the vehicle V on the course is, for example, one of the positions of the vehicle V on the traveling plan, at a plurality of future times that are set in advance at given time intervals. The given time interval may be one second, or 0.5 sec., for example. The given time interval may be set to be smaller as the vehicle speed of the vehicle V is higher. The number of the future times may be two or more. The system confidence level calculated by the system confidence level calculating unit 36 may be lower as the distance from the vehicle V is larger.

In another example, the position of the vehicle V on the course may be one of a plurality of positions that are spaced at given intervals from each other, using the vehicle V as a start point, on the course of the vehicle V. The given interval may be 10 m, or 15 m. The number of the positions for which the system confidence level is calculated may be fixed, or may be changed according to the vehicle speed of the vehicle V, for example. The number of the positions used for calculation may be increased as the vehicle speed of the vehicle V is higher.

The system confidence level calculating unit 36 can calculate a future system confidence level at a position of the vehicle V on the course, by predicting the behavior of a moving object or objects around, the vehicle V, from the external environment of the vehicle V. For example, the system confidence level calculating unit 36 estimates the number of moving objects around the vehicle V, at each position of the vehicle V on the course, by predicting the behavior of the moving objects around the vehicle V. When the estimated number of the moving objects is equal to or larger than a given value, the system confidence level calculated by the system confidence level calculating unit 36 is a lower value than that in the case where the number of the moving objects around the vehicle V is smaller than the given value.

The system confidence level calculating unit 36 may determine whether a preceding vehicle exists within a given distance of the vehicle V, at each position of the vehicle V on the course, through prediction of the behavior of other vehicles around the vehicle V, and may calculate the system confidence level for each position of the vehicle V on the course, from the result of determination about the presence or absence of the preceding vehicle. Also, the system confidence level calculating unit 36 may estimate the inter-vehicle distance between the vehicle V and a preceding vehicle, through prediction of the behavior of the preceding vehicle at each position of the vehicle V on the course, and may calculate the system confidence level for each position of the vehicle V on the course, based on the result of estimation of the inter-vehicle distance between the vehicle V and the preceding vehicle. The system confidence level may be calculated in a similar manner, with respect to a following vehicle, and a vehicle that travels side by side with the vehicle V.

The system confidence level calculating unit 36 may estimate the time to collision of the vehicle V with a moving object, at each position of the vehicle V on the course, and use it for calculation of the system confidence level. Also, the system confidence level calculating unit 36 may predict the shielding rate in the detection range of the external sensor 21 at each position of the vehicle V on the course, in view of map information including information on positions of stationary objects, in addition to prediction of the behavior of a moving object or objects, and may use the shielding rate for calculation of the system confidence level. Also, the system confidence level calculating unit 36 may calculate the system confidence level for each position of the vehicle V on the course, using the degree of interference of a moving object with the course of the vehicle V or the level of danger of a moving, object around the vehicle V as described above.

The system confidence level calculating unit 36 may calculate the system confidence level at each position of the vehicle V on the course, based on the map information. For example, the system confidence level calculating unit 36 predicts the number of targets that can be recognized at each position of the vehicle V on the course, based on the map information. When the number of targets that can be recognized at a certain position on the course is smaller than a target threshold value, the system confidence level at this position, which is calculated by the system confidence level calculating unit 36, may be a lower value than that in the case where the number of the targets is equal to or larger than the target threshold value. When the position of the vehicle V on the course is included in a region of which the map information has a low accuracy, the system confidence level at this position, which is calculated by the system confidence level calculating unit 36, may be a lower value than that in the case where the position in question is not included in the region of which the map information has a low accuracy. The system confidence level may also be calculated in a similar manner, in the case where the position of the vehicle V on the course is located in complicated road circumstances, and the case where the position of the vehicle V on the course is located in a poor visibility region.

Next, the manner of specifying a cause of reduction of the system confidence level calculated by the system confidence level calculating unit 36 will be described. When the system confidence level becomes lower than a cause specification threshold value, the system confidence level calculating unit 36 specifies the cause of reduction of the system confidence level. Causes of reduction of the system confidence level may include increase of the number of moving objects around the vehicle V. The number of moving objects may be classified into the number of pedestrians, and the number of other vehicles.

The causes of reduction of the system confidence level may include the short inter-vehicle distance between the vehicle V and a preceding vehicle, and the presence of a vehicle that travels side by side with the vehicle V. The causes of reduction of the system confidence level may include the number of targets recognized, and the position of the vehicle V being in a region of which the map information has a low accuracy. The causes of reduction of the system confidence level may include increase of the shielding rate in the detection range of the external sensor 21, and a sensor abnormality in the vehicle V. The causes of reduction of the system confidence level may also include various factors used in calculation of the system confidence level as described above.

When the system confidence level becomes lower than the cause specification threshold value, due to two or more factors, the system confidence level calculating unit 36 specifies the most influencing factor that has the largest influence on the system confidence. When the amount of reduction of the system confidence level is determined in advance with respect to each factor, the system confidence level calculating unit 36 specifies a factor that causes the largest amount of reduction of the system confidence level, as the cause of reduction of the system confidence level. In another example, the system confidence level calculating unit 36 may set priorities in the factors in advance, and specify a factor having the highest priority as the cause of reduction of the system confidence level.

The system confidence level calculating unit 36 specifies the cause of reduction of the system confidence level in a similar manner, with respect to the future system confidence level corresponding to each position of the vehicle V on the course. In this connection, the system confidence level calculating unit 36 may specify the cause of reduction of the system confidence level, when the amount of reduction of the system confidence level within a given period of time is equal to or larger than a reduction amount threshold value, rather than when the system confidence level becomes lower than the cause specification threshold value.

Configuration of Display Device

Next, the configuration of the display device 1 according to this embodiment will be described. The display device 1 displays an image related to automatic drive control of the automatic driving system 2, to the driver, based on information obtained from the automatic driving system 2.

The information obtained from the automatic driving system 2 includes information concerning the course of the traveling plan, information concerning the system confidence level, and information concerning the cause of reduction of the system confidence level. The information obtained from the automatic driving system 2 may also include at least one of the map information of the map database 22, the position of the vehicle V on the map, the external environment of the vehicle V, and traveling conditions of the vehicle V.

The display device 1 includes at least a part of the display control ECU 10 installed on the vehicle V, and a human machine interface (HMI) 4. However, the display device is not necessary to include HMI 4 and the display device may be configured to communicate with a HMI device different from the display device. The display control ECU 10 is an electronic control unit having CPU, ROM, RAM, etc. The display control ECU 10 controls the hardware based on signals generated from the CPU, and implements various functions that will be described later.

The HMI 4 is an interface that permits input and output of information among the display device 1, automatic driving system 2, and the driven. The HMI 4 has an on-board display 41 and a speaker 42.

The on-board display 41 is a display device for the driver, which is installed on the vehicle V. The on-board display 41 may be in the form of a head-up display (HUD), for example. The HUD is a display that projects and displays an image on a front windshield of the vehicle V, such that the image is superimposed on a landscape in front of the vehicle, as viewed from the driver. The HUD has a projector provided under the dashboard, on the back side of the instrument panel of the vehicle V, for example. The projector projects the image, by irradiating the front windshield with light, via an opening provided on the dashboard. The driver can visually recognize the image, when the image is reflected by a surface of the front windshield. Here, HUD, of which a mobile terminal of the driver or the like is used as the projector, may be used as the HMI device when the display device does not include the HMI 4. The on-board display 41 projects and displays various images on the front windshield, according to a control signal from the display control ECU 10 or the automatic driving ECU 3.

The speaker 42 is an output unit that generates voice or sound. The speaker 42 is provided on the inner side of a door of the vehicle V, for example. The speaker 42 generates voice to the driver, according to a control signal from the display control ECU 10 or the automatic driving ECU 3.

In the following, the functional configuration of the display control ECU 10 will be described. The display control ECU 10 has a traveling plan obtaining unit 11, confidence level obtaining unit 12, cause recognizing unit 13, and display controller 14.

The traveling plan obtaining unit 11 obtains a traveling plan created by the traveling plan creating unit 34 of the automatic driving system 2. The traveling plan obtaining unit 11 obtains the traveling plan of the automatic drive control, based on information concerning the traveling plan, which is transmitted from the automatic driving ECU 3, for example. The traveling plan includes the course of the vehicle V. The traveling plan obtaining unit 11 does not need to obtain the entire information of the traveling plan, but may obtain a portion of the information of the traveling plan, which is used for display of pointers that will be described later.

The confidence level obtaining unit 12 obtains the system confidence level of the automatic drive control calculated by the system confidence level calculating unit 36 of the automatic driving system 2. The confidence level obtaining unit 12 obtains the system confidence level, based on information on the system confidence level transmitted from the automatic driving ECU 3, for example. The system confidence level is calculated based on at least the external environment of the vehicle V.

The cause recognizing unit 13 recognizes the cause of reduction of the system confidence level specified by the system confidence level calculating unit 36 of the automatic driving system 2. For example, the cause recognizing unit 13 recognizes the cause of reduction of the system confidence level, based on information about the cause of reduction of the system confidence level transmitted from the automatic driving ECU 3. The cause recognizing unit 13 may recognize the cause each time the system confidence level calculating unit 36 specifies the cause of reduction of the system confidence level, or may recognize the cause when a pointer display mode that will be described later is changed due to reduction of the system confidence level.

The display controller 14 causes the on-board display 41 to display a pointer as an image indicating the course of the vehicle V, during automatic drive control of the vehicle V. The display controller 14 displays the pointer such that it corresponds to the course of the vehicle V as viewed from the driver of the vehicle V, based on the traveling plan obtained by the traveling plan obtaining unit 11. The image of the pointer is not limited to any particular image, but may be any image provided that the driver can grasp the course of the vehicle V under automatic drive control, from the image. The pointer may be an inverted U-shaped image with rounded corners or angled corners that is open on one side closer to the vehicle V, and is closed on the other side far from the vehicle V, for example. The pointer may be an inverted V-shaped image of which a distal end points in the traveling direction of the vehicle V, or may be a triangular shape of which one vertex points in the traveling direction of the vehicle V. Also, the pointer may be an image of a vehicle which images the vehicle V.

For example, the display controller 14 causes the on-board display 41 to project and display an image of the pointer on the front windshield of the vehicle V. Thus, the display controller 14 can bring the image of the pointer into the field of vision of the driver of the vehicle V, such that the image is superimposed on a landscape in front of the vehicle V.

The display controller 14 may determine the display position of the pointer, based on the external environment (such as the position of a demarcation line or lines ahead of the vehicle V) of the vehicle V recognized by the external environment recognizing unit 32 of the automatic driving system 2 and the position of the viewpoint of the driver, in addition to the traveling plan. The viewpoint position of the driver may be a predetermined position, or a position measured by a driver monitor camera, or the like, of the vehicle V.

The display controller 14 displays a plurality of pointers corresponding to respective positions of the vehicle V on the course. The definition of the position of the vehicle V on the course has been described above in connection with calculation of the system confidence level. As one example, the display controller 14 displays a plurality of pointers such that they correspond to positions of the vehicle V on the traveling plan, at a plurality of future times that are set in advance at given time intervals. The positions of the vehicle V on the traveling plan at the future times can be obtained from the traveling plan. The display controller 14 can project and display the pointers on the front windshield, using a known technology of HUD display control, such that the pointers correspond to respective positions of the vehicle V on the traveling plan at a plurality of future times separated at given time intervals, as viewed from the driver. The display controller 14 may display the arrival time (e.g., one second later, two seconds later) of the vehicle V in the vicinity of each pointer.

The number of pointers displayed may be set in advance, or may be increased or reduced according to the vehicle speed of the vehicle V, etc. For example, the number of pointers may be increased as the vehicle speed of the vehicle V is higher. The number of pointers is increased by adding a pointer on the side far from the vehicle V, to a pointer on the side close to the vehicle V, for example. The number of pointers displayed may be the same as the number of the positions on the course of the vehicle V for each of which the system confidence level is calculated by the system confidence level calculating unit 36. The number of pointer(s) may be one.

Figure 2:
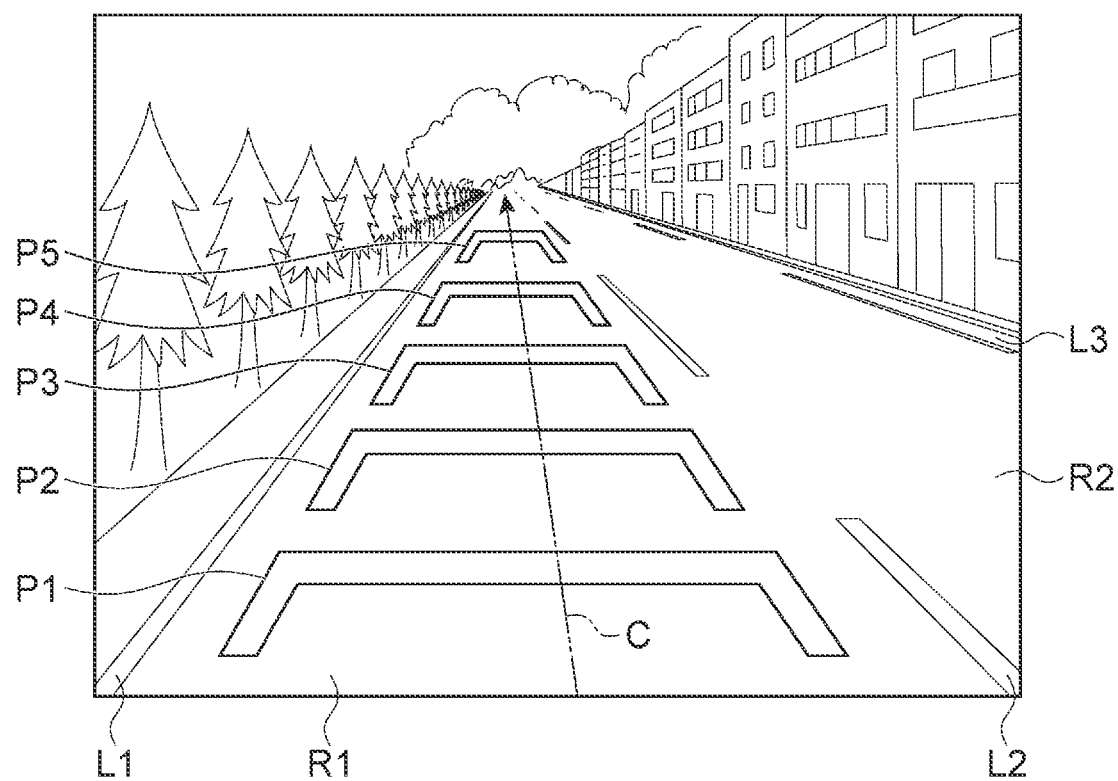
FIG. 2 is a view showing one example of a display mode of pointers.

FIG. 2 shows one example of a display mode of pointers. FIG. 2 shows a situation where pointers are projected and displayed on the front windshield of the vehicle V. In FIG. 2, a traveling lane R1 on which the vehicle V travels, oncoming lane R2 opposed to the traveling lane R1, demarcation line L1 of the traveling lane R1, centerline L2 that separates the traveling lane R1 from the oncoming lane R2, demarcation line L3 of the oncoming lane R2, course C of the vehicle V, and pointers P1 to P5 are illustrated.

The pointers P1 to P5 are projected and displayed on the front windshield of the vehicle V by the on-board display 41. The pointers P1 to P5 are displayed in order of P1, P2, P3, P4, P5, from the side closer to the vehicle V toward the side far from the vehicle V.

The pointers P1 to P5 correspond to respective positions of the vehicle V on the traveling plan at a plurality of future times separated at given intervals. More specifically, the pointer P1 corresponds to a position of the vehicle V reached one second later on the traveling plan. The pointer P2 corresponds to a position of the vehicle V reached two seconds later on the traveling plan. The pointer P3 corresponds to a position of the vehicle V reached three seconds later on the traveling plan. The pointer P4 corresponds to a position of the vehicle V reached four seconds later on the traveling plan. The pointer P5 corresponds to a position of the vehicle V reached five seconds later on the traveling plan.

While the course C of the vehicle V passes the center of the traveling lane R1 in FIG. 2, the course C does not necessarily pass the center of the traveling lane R1. When the vehicle V makes a lane change, the course C of the vehicle V crosses a demarcation line of a lane as a destination of the lane change, and at least one of the pointers P1 to P5 is displayed as being superimposed on the demarcation line. Also, the course C of the vehicle V does not need to be displayed on the front windshield of the vehicle V.

The display controller 14 changes the display mode of the pointers according to the system confidence level. That is, the display controller 14 sets the display mode of each of the pointers based on the system confidence level at a position corresponding to each of the pointers. Changes of the display mode include at least one of change in the degree of transparency, change in luminance, change in color, change in shape, change in size, change in the presence or absence of blinking, change in blinking speed, change in the presence or absence of flickering, and change in the flickering amount. Where the pointer is three-dimensionally displayed, the display mode may include the apparent height (e.g., the apparent height relative to the road surface) in the three-dimensional display.

When the system confidence level is lower than a confidence level threshold value, for example, the display controller 14 makes the degree of transparency of the pointer higher than that in the case where the system confidence level is equal to or higher than the confidence level threshold value. The confidence level threshold value may be the same value as the cause specification threshold value mentioned above in description of calculation of the system confidence level. The confidence level threshold value may be a fixed value, or may be changed through setting of the occupant, for example.

The degree of transparency of the pointer is a degree of penetration of the background overlapping the pointer, through the pointer. Examples of the background overlapping the pointer include a road surface, demarcation lines, and road signs, such as a stop line. The method of adjusting the degree of transparency is not limited to any particular method. The degree of transparency may be adjusted by changing the quantity of light for displaying the pointer, for example.

More specifically, when the system confidence level is equal to or higher than the confidence level threshold value, the display controller 14 displays the pointer in a standard display mode with predetermined, standard transparency. The standard transparency may be a degree of transparency which permits the background to be faintly seen from the driver, or may be a degree of transparency with which the background can be hardly seen. When the system confidence level is lower than the confidence level threshold value, the display controller 14 displays the pointer in a display mode of increased transparency. FIG. 2 shows the case where the system confidence level is equal to or higher than the confidence level threshold value, and the pointers P1 to P5 are indicated in the standard display mode.

Figure 3:
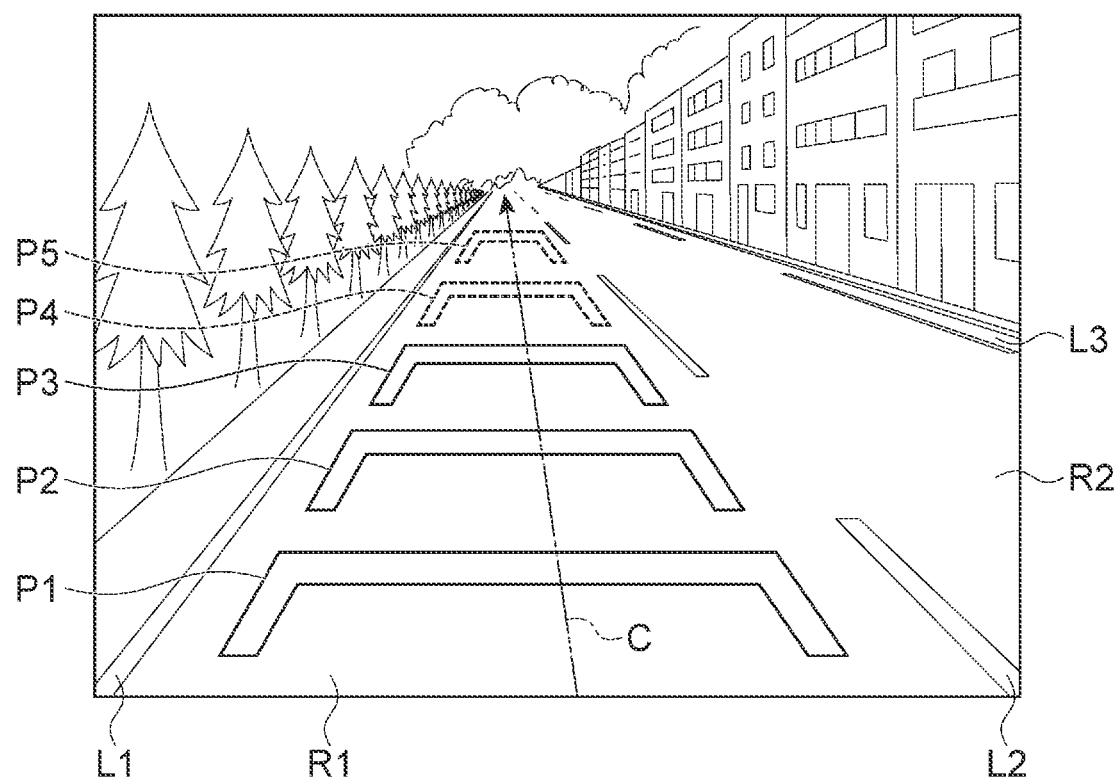
FIG. 3 is a view showing one example of change of the display mode of pointers due to reduction of a system confidence level.

FIG. 3 shows one example of change of the display mode of pointers due to reduction of the system confidence level. In FIG. 3, the pointer P4 and the pointer P5 are displayed in the display mode of increased transparency due to reduction of the system confidence level. Namely, the system confidence levels at positions corresponding to the pointer P4 and pointer P5 are lower than the confidence level threshold value. The display controller 14 changes the display mode of the pointers, among the pointers P1 to P5, where the system confidence levels at the corresponding positions are lower than the confidence level threshold value, from the standard display mode to the display mode of increased transparency.

Figure 4A:
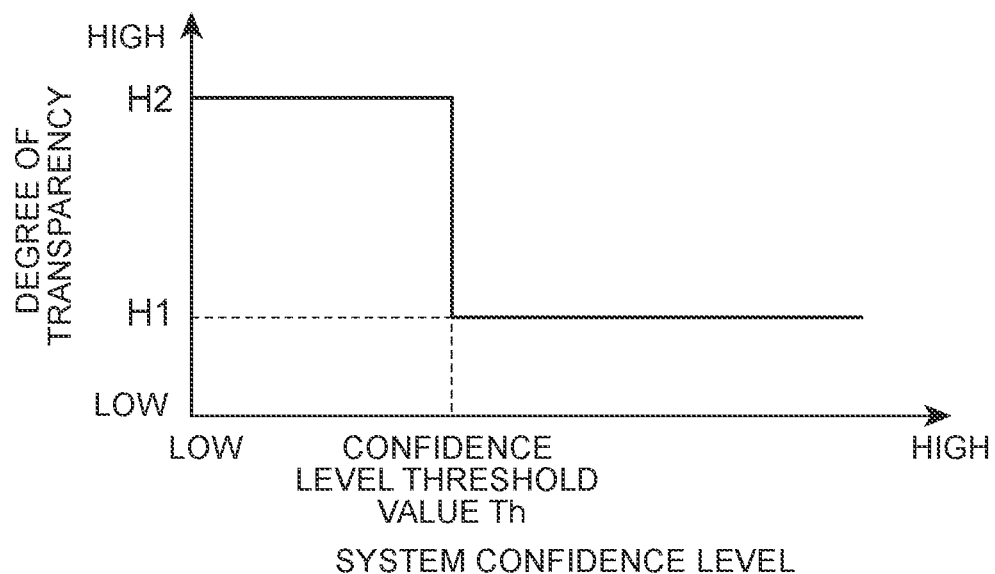
FIG. 4A is a graph showing one example of the relationship between the degree of transparency of a pointer and the system confidence level.

The graph of FIG. 4A shows one example of the relationship between the degree of transparency of a pointer and the system confidence level. In FIG. 4A, the vertical axis indicates the degree of transparency, and the horizontal axis indicates the system confidence level. As shown in FIG. 4A, when the system confidence level at a position corresponding to the pointer is equal to or higher than the confidence level threshold value Th, the display controller 14 sets the degree of transparency of the pointer to H1 (standard transparency). When the system confidence level at the position corresponding to the pointer is lower than the confidence level threshold value Th, the display controller 14 sets the degree of transparency of the pointer to H2, which is higher than the degree of transparency H1.

The display controller 14 may change the degree of transparency of the pointer in stages, using two or more threshold values. The display controller 14 may increase the degree of transparency of the pointer in stages, as the system confidence level is lower.

Figure 4B:
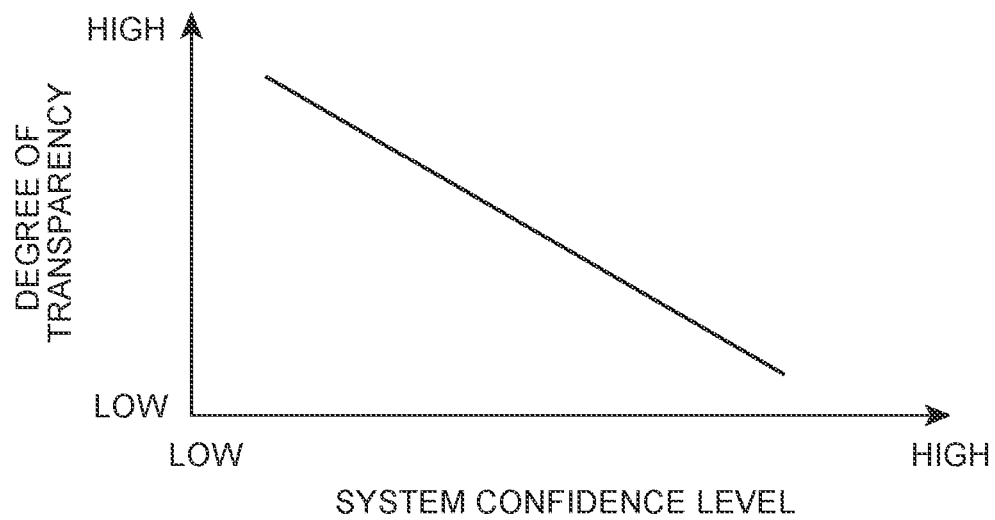
FIG. 4B is a graph showing another example of the relationship between the degree of transparency of the pointer and the system confidence level.

As the system confidence level at a position corresponding to a pointer is lower, the display controller 14 may continuously increase the degree of transparency of the pointer. FIG. 4B is a graph showing another example of the relationship between the degree of transparency of the pointer and the system confidence level. As shown in FIG. 4B, the display controller 14 may increase the degree of transparency of the pointer, as the system confidence level at the position corresponding to the pointer is lower, and may reduce the degree of transparency of the pointer, as the system confidence level at the position corresponding to the pointer is higher. The display controller 14 may set the lowest value of the degree of transparency of the pointer, and may set the highest value of the degree of transparency of the pointer. The display controller 14 may eliminate display of the pointer as the system confidence level is reduced. When the display mode of the pointer is changed due to reduction of the system confidence level, the display controller 14 may inform the driver by voice of the position at which the change is made. The display controller 14 sends a control signal to the speaker 42, so as to perform voice output.

When the display mode of the pointer is changed due to reduction of the system confidence level, the display controller 14 changes the display mode of the pointer, according to the cause of reduction of the system confidence level recognized by the cause recognizing unit 13.

The display controller 14 changes the display mode of the pointer in view of behavior requested to be performed by the driver, based on the cause of reduction of the system confidence level, for example. More specifically, when the cause of reduction of the system confidence level is a driving-mode switching induction factor, the display controller 14 may set the color of the pointer to a color having a higher degree of stimulation (a highly stimulating color), as compared with the case where the cause of reduction of the system confidence level is not the driving-mode switching induction factor.

The driving-mode switching induction factor is a factor that may make automatic drive control difficult, and may request the driver to switch from automatic drive control to driving principally performed by the driver. The driving-mode switching induction factor may be selected from at least one of the number of pedestrians around the vehicle V being equal to or larger than a first threshold value, a sensor abnormality (including reduction of the sensor accuracy due to dirt, an influence of a weather etc., to an extent that makes automatic drive control difficult) in the vehicle V, entry of the vehicle V into a region where the map accuracy is low (entry into a region where the map accuracy is too low to permit execution of automatic drive control), etc. The pedestrians may include bicycles.

Figure 5:
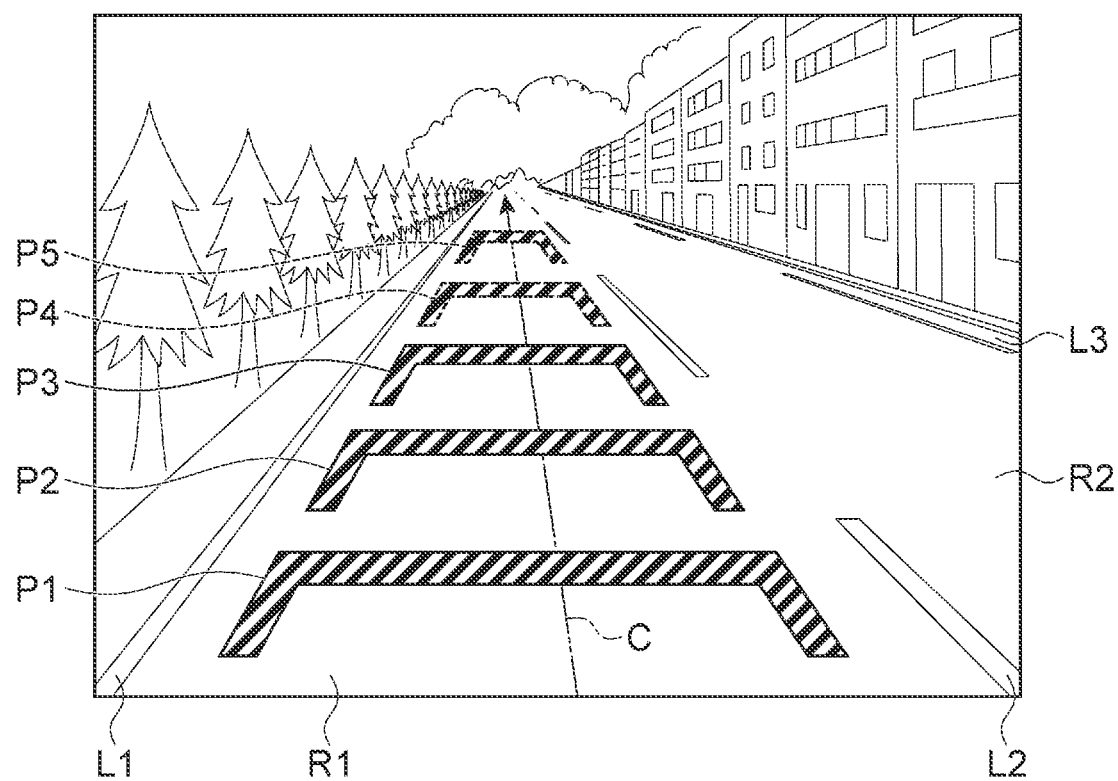
FIG. 5 is a view showing one example of the display mode of pointers in the case where the cause of reduction of the system confidence level is a driver intervention suggestion factor.

FIG. 5 shows one example of the display mode of pointers when the cause of reduction of the system confidence level is a driving-mode switching induction factor. In FIG. 5, as in FIG. 3, the pointer P4 and the pointer P5 are displayed in the display mode of increased transparency, due to reduction of the system confidence level. As shown in FIG. 5, when the cause of reduction of the system confidence level is a driving-mode switching induction factor, the display controller 14 changes the display mode by changing the color of all of the pointers P1 to P5 to a highly stimulating color. As the highly stimulating color, red color may be used, for example.

When the cause of reduction of the system confidence level is a driver intervention suggestion factor, the display controller 14 may set the color of pointers to a color having a higher degree of stimulation, than that in the case where the cause of reduction of the system confidence level is neither the driver intervention suggestion factor nor the driving-mode switching induction factor. On the other hand, when the cause of reduction of the system confidence level is the driver intervention suggestion factor, the display controller 14 sets the color of pointers to a color having a lower degree of stimulation, than that in the case where the cause of reduction of the system confidence level is the driving-mode switching induction factor.

The driver intervention suggestion factor is a factor that can make it necessary to have the driver take over driving (a factor that requests the driver to take over driving if he/she can afford to do). The driver intervention suggestion factor may be selected from at least one of increase of the shielding rate in the detection range of the external sensor 21, reduction of the sensor accuracy of the vehicle V, etc. The driver intervention suggestion factor may include a condition where the number of pedestrians around the vehicle V is equal to or larger than a second threshold value that is smaller than the first threshold value. The second threshold value is a threshold value that is set in advance as a value smaller than the first threshold value.

Figure 6:
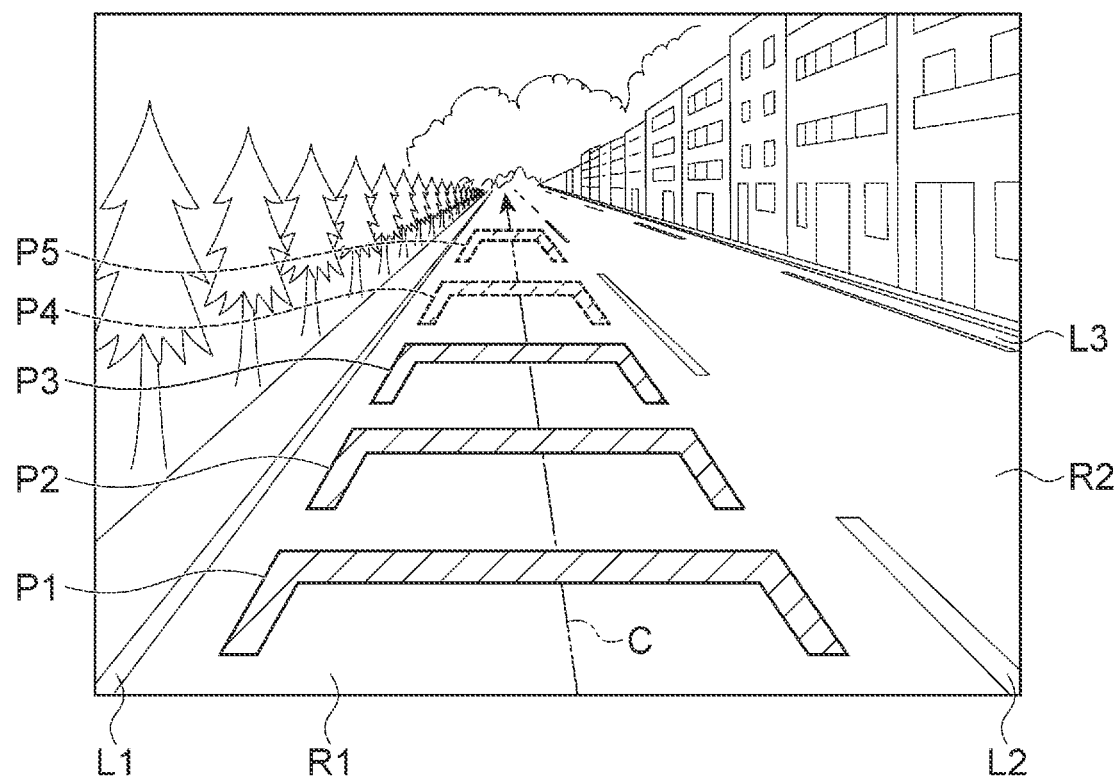
FIG. 6 is a view showing one example of the display mode of pointers in the case where the cause of reduction of the system confidence level is a driving-mode switching induction factor.

FIG. 6 shows one example of the display mode of pointers when the cause of reduction of the system confidence level is the driver intervention suggestion factor. In FIG. 6, as in FIG. 3, the pointer P4 and the pointer P5 are displayed in the display mode of increased transparency, due to reduction of the system confidence level. As shown in FIG. 6, when the cause of reduction of the system confidence level is the driver intervention suggestion factor, the display controller 14 changes the display mode by changing the color of all of the pointers P1 to P5 to a moderately stimulating color. As the moderately stimulating color, orange color or yellow color may be used, for example.

When the cause of reduction of the system confidence level is neither the driver intervention suggestion factor nor the driving-mode switching induction factor, the display controller 14 displays the pointers with a preset standard color. As the standard color, blue color or green color may be used, for example. In another example, the degree of stimulation of color may be defined using color saturation. For example, the color saturation may be increased as the degree of stimulation is higher.

When the cause of reduction of the system confidence level differs among a plurality of positions on the course C of the vehicle V, and the causes of reduction of the system confidence level at the positions include at least one driving-mode switching induction factor, the display controller 14 changes the display modes of the pointers P1 to P5 while giving priority to the driving-mode switching induction factor. Similarly, when the cause of reduction of the system confidence level differs among a plurality of positions on the course C of the vehicle V, and the causes of the reduction of the system confidence level at the positions include at least one driver intervention suggestion factor, but does not include any driving mode s witching induction factor, the display controller 14 changes the display modes of the pointers P1 to P5 while giving priority to the driver intervention suggestion factor.

In this connection, the display controller 14 does not need to display all of the pointers P1 to P5 with the same color, according to the cause of reduction of the system confidence level. The display controller 14 may change the display mode to that of a highly stimulating color or a moderately stimulating color, with respect to only the pointer P4 and pointer P5 where the system confidence level is reduced. When the causes of reduction of the system confidence level at the pointer P4 and the pointer P5 are different from each other, the display controller 14 may change the display mode of the pointer P4 and that of the pointer P5 according to the respective causes. The display controller 14 may inform the driver by voice of the cause of reduction of the system confidence level. The display controller 14 sends a control signal to the speaker 42, so as to output the cause of reduction of the system confidence level by voice.

Processing of Display Device

Figure 7:
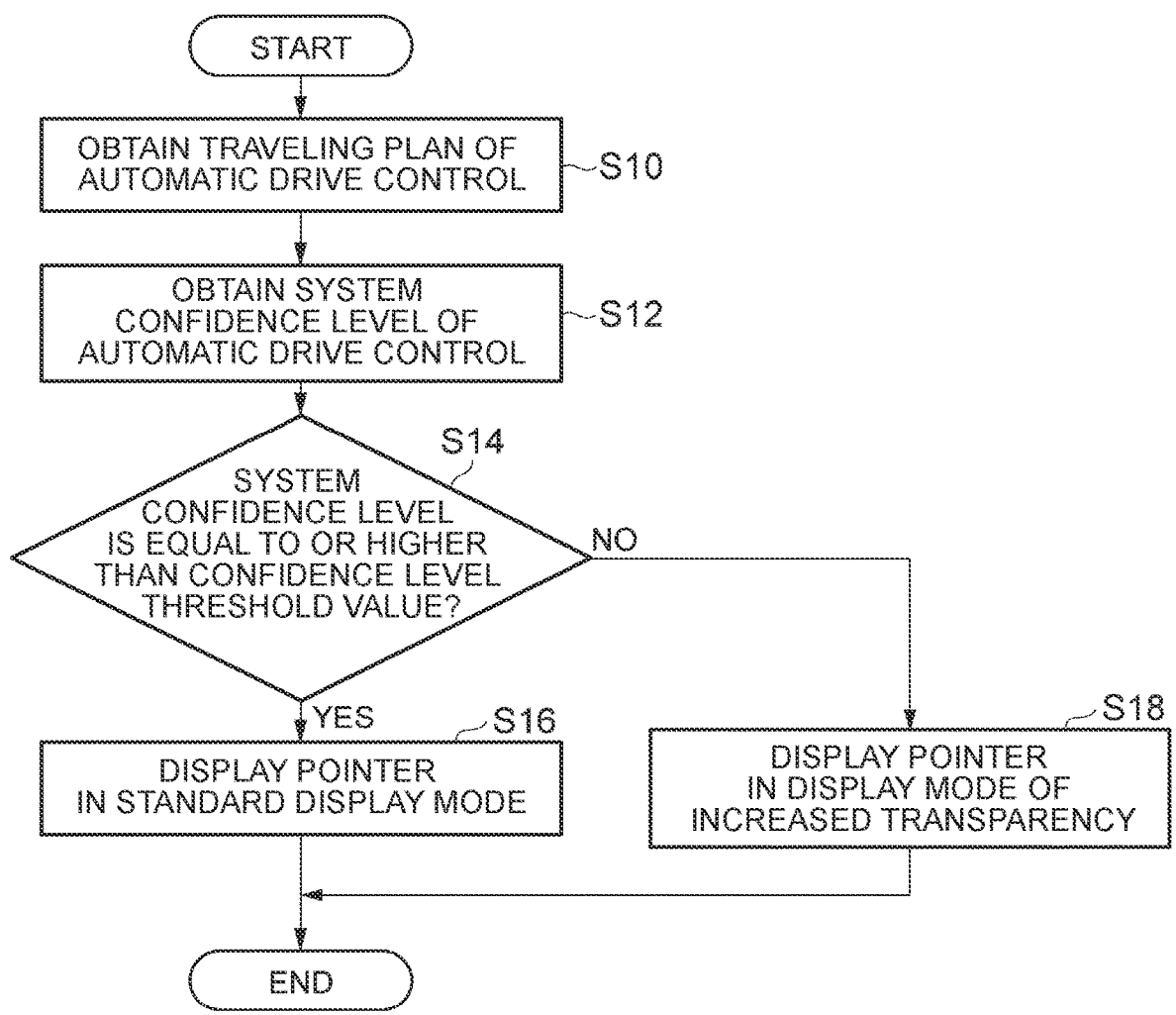
FIG. 7 is a flowchart illustrating one example of a process of displaying a pointer according to the system confidence level.

Next, the processing of the display device 1 according to this embodiment will be described. FIG. 7 is a flowchart illustrating a process of displaying a pointer according to the system confidence level. The process of the flowchart shown in FIG. 7 is executed when the vehicle V is operating under automatic drive control.

As shown in FIG. 7, the display control ECU 10 of the display device 1 causes the traveling plan obtaining unit 11 to obtain the traveling plan from the automatic driving system 2 in step S10. The traveling plan obtaining unit 11 obtains the traveling plan of automatic drive control, based on information concerning the traveling plan, which is transmitted from the automatic driving ECU 3, for example. Then, the display control ECU 10 proceeds to step S12.

In step S12, the display control ECU 10 causes the confidence level obtaining unit 12 to obtain the system confidence level of automatic drive control. The confidence level obtaining unit 12 obtains the system confidence level, based on information on the system confidence level, which is transmitted from the automatic driving ECU 3, for example. Then, the display control ECU 10 proceeds to step S14.

In step S14, the display control ECU 10 causes the display controller 14 to determine whether the system confidence level is equal to or higher than the confidence level threshold value. When two or more pointers corresponding to two or more positions on the course C of the vehicle are displayed, the display controller 14 makes the above determination with respect to each of the pointers. When the system confidence level is equal to or higher than the confidence level threshold value (YES in step S14), the display control ECU 10 proceeds to step S16. When the system confidence level is lower than the confidence level threshold value (NO in step S14), the display control ECU 10 proceeds to step S18.

In step S16, the display control ECU 10 causes the display controller 14 to display the pointer in a standard display mode. The display controller 14 sends a control signal to the on-board display 41 of the HMI 4, so as to display the pointer on the front windshield of the vehicle V in the standard display mode. The pointer is displayed so as to indicate the course C of the vehicle V. Then, the display control ECU 10 finishes the current cycle of the process.

In step S18, the display control ECU 10 causes the display controller 14 to display the pointer in the display mode of increased transparency. The display controller 14 sends a control signal to the on-board display 41 of the HMI 4, so as to display the pointer on the front windshield of the vehicle V, in the display mode of increased transparency. The pointer is displayed so as to indicate the course C of the vehicle V. Then, the display control ECU 10 finishes the current cycle of the process. In the flowchart shown in FIG. 7, the order of steps S10 and S12 may be reversed, or steps S10 and S12 may be executed at the same time.

Figure 8:
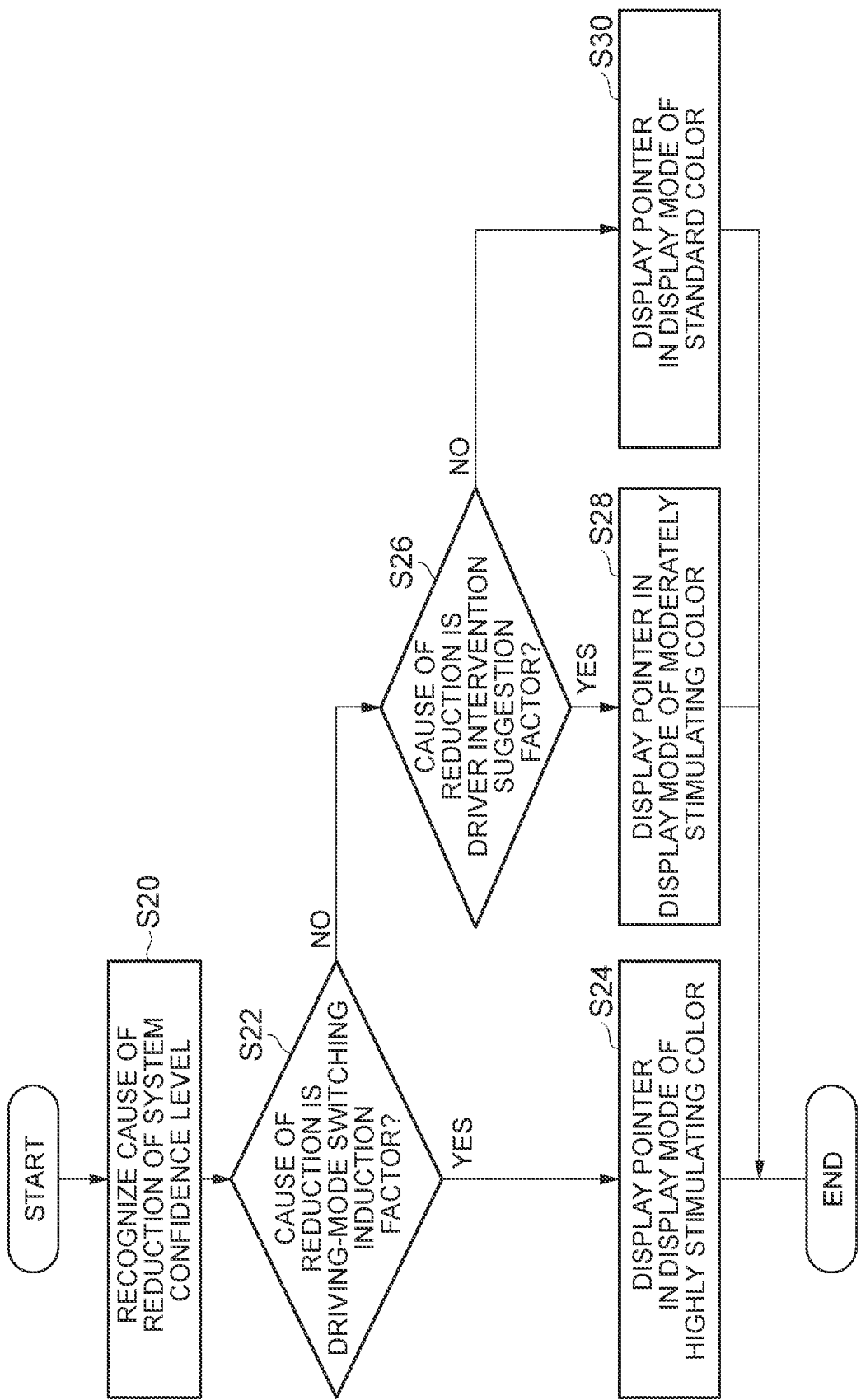
FIG. 8 is a flowchart illustrating one example of a process of displaying a pointer according to the cause of reduction of the system confidence level.

FIG. 8 is a flowchart illustrating one example of a process of displaying a pointer based on the cause of reduction of the system confidence level. The process of the flowchart shown in FIG. 8 is executed when step S18 shown in FIG. 7 is executed. The process of the flowchart of FIG. 8 may be performed with respect to each pointer.

As shown, in FIG. 8, in step S20, the display control ECU 10 causes the cause recognizing unit 13 to recognize the cause of reduction of the system confidence level. For example, the cause recognizing unit 13 recognizes the cause of reduction of the system confidence level specified by the system confidence level calculating unit 36 of the automatic driving system 2, for example. Then, the display control ECU 10 proceeds to step S22.

In step S22, the display control ECU 10 causes the display controller 14 to determine whether the cause of reduction of the system confidence level is a driving-mode switching induction factor. When the display controller 14 determines that the cause of reduction of the system confidence level is the driving-mode switching induction factor (YES in step S22), the display control ECU 10 proceeds to step S24. When the display controller 14 determines that the cause of reduction of the system confidence level is not the driving-mode switching induction factor (NO in step S22), the display control ECU 10 proceeds to step S26.

In step S24, the display control ECU 10 causes the display controller 14 to display the pointer in the display mode of highly stimulating color. The display controller 14 sends a control signal to the on-board display 41 of the HMI 4, so as to display the pointer in the display mode of highly stimulating color. Then, the display control ECU 10 finishes the current cycle of the process.

In step S26, the display control ECU 10 causes the display controller 14 to determine whether the cause of reduction of the system confidence level is a driver intervention suggestion factor. When the display controller 14 determines that the cause of reduction of the system confidence level is the driver intervention suggestion factor (YES in step S26), the display control ECU 10 proceeds to step S28. When the display controller 14 determines that the cause of reduction of the system confidence level is not the driver intervention suggestion factor (NO in step S26), the display control ECU 10 proceeds to step S30.

In step S28, the display control ECU 10 causes the display controller 14 to display the pointer in the display mode of moderately stimulating color. The display controller 14 sends a control signal to the on-board display 41 of the HMI 4, so as to display the pointer in the display mode of moderately stimulating color. Then, the display control ECU 10 finishes the current cycle of the process.

In step S30, the display control ECU 10 causes the display controller 14 to display the pointer in the display mode of standard, color. The display controller 14 sends a control signal to the on-board display 41 of the HMI 4, so as to display the pointer in the display mode of standard color. Then, the display control ECU 10 finishes the current cycle of the process.

The display device 1 according to this embodiment as described above changes the display mode of the pointer as an image indicating the course during automatic drive control, according to the system confidence level obtained by the confidence level obtaining unit 12. It is thus possible to provide display that enables the driver to intuitively grasp the possibility of continuing automatic drive control, as compared with the case where the display mode of the pointer is not changed according to the system confidence level.

Also, the display device 1 uses the HUD as the on-board display 41, for projecting and displaying the pointer on the front windshield of the vehicle V while superimposing the pointer on the landscape in front of the vehicle, thereby to enable the driver to visually recognize the pointer merely by seeing forward of the vehicle, and make it easy for the driver to grasp change of the system confidence level, through change of the display mode of the pointer. Also, the display device 1 changes the degree of transparency of the pointer as change of the display mode of the pointer. More specifically, the degree of transparency of the pointer when the system confidence level is lower than the confidence level threshold value is made higher than the degree of transparency of the pointer when the system confidence level is equal to or higher than the confidence level threshold value, or the degree of transparency of the pointer is increased as the system confidence level is lower. As the degree of transparency of the pointer is higher, it becomes more difficult for the driver to see the pointer, thus enabling the driver to intuitively grasp reduction of the possibility of continuing automatic drive control.

Further, according to the display device 1, a plurality of pointers respectively corresponds to positions of the vehicle on the traveling plan at a plurality of future times; therefore, the display mode of each pointer can be changed according to the system confidence level for each position, and the driver can grasp the possibility of continuing automatic drive control with respect to each position of the vehicle V on the course C.

Also, when the display device 1 changes the display mode of the pointer due to reduction of the system confidence level, it changes the display mode of the pointer according to the cause of reduction of the system confidence level; therefore, the driver can grasp the cause of reduction of the system confidence level, from the display mode of the pointer, and can more appropriately grasp the possibility of continuing automatic drive control.

The above embodiment may be subjected to various changes and improvements, based on the knowledge of those skilled in the art.

For example, the display control ECU 10 is not necessarily a separate unit from the automatic driving ECU 3, but may be a part of the automatic driving ECU 3.

The change in the display mode of the pointer is not limited to change of the degree of transparency. The display controller 14 may reduce the luminance of a pointer in stages or continuously, as the system confidence level at a position corresponding to the pointer is lower. An example of change in stages is shown in FIG. 4A, and an example of continuous change is shown in FIG. 4B.

The display controller 14 may change the color of a pointer in stages or continuously from a color having a low degree of stimulation to a color having a high degree of stimulation in stages or continuously, as the system confidence level at a position corresponding to the pointer is lower. The display controller 14 may change the color of a pointer such that the color saturation of the pointer increases in stages or continuously as the system confidence level at a position corresponding to the pointer is lower.

Conversely, the display controller 14 may change the color of a pointer in stages or continuously from a color having a high degree of stimulation to a color having a low degree of stimulation, as the system confidence level at a position corresponding to the pointer is lower. Similarly, the display controller 14 may change the color of a pointer such that the color saturation of the pointer decreases in stages or continuously as the system confidence level at a position corresponding to the pointer is lower.

When the system confidence level at a position corresponding to a pointer is lower than a threshold value for shape, the display controller 14 may change the shape of the pointer, as compared with the case where the system confidence level is equal to or higher than the threshold value for shape. When the system confidence level is lower than the threshold value for shape, the display controller 14 may change the thickness of the pointer (the thickness of each pointer P1-P5 shown in FIG. 2 as measured in the traveling direction of the vehicle V, for example) such that the thickness becomes smaller than that in the case where the system confidence level is equal to or higher than the threshold value for shape. When the system confidence level is lower than the threshold value for shape, for example, the display controller 14 may change the line width of the pointer (e.g., the line width of each pointer P1-P5 shown in FIG. 2 as measured in the traveling direction of the vehicle V, for example) such that the line width becomes smaller than that in the case where the system confidence level is equal to or higher than the threshold value for shape. When the system confidence level is lower than the threshold value for shape, the display controller 14 may change the shape of the pointer from an angular shape to a rounded shape, as compared with the case where the system confidence level is equal to or higher than the threshold value for shape.

The display controller 14 may reduce the size of a pointer in stages or continuously as the system confidence level at a position corresponding to the pointer is lower. The display controller 14 may blink a pointer when the system confidence level at a position corresponding to the pointer is lower than a threshold value for blink. The display controller 14 may increase the blinking speed in stages or continuously as the system confidence level is lower. Alternatively, the display controller 14 may reduce the blinking speed in stages or continuously as the system confidence level is lower.

The display controller 14 may display a pointer such that the pointer flickers, when the system confidence level at a position corresponding to the pointer is lower than a threshold value for flickering. The flickering direction is not limited to any particular direction, but may be the lateral direction of the vehicle V, for example. The display controller 14 may increase the flickering amount of the pointer in stages or continuously as the system confidence level at a position corresponding to the pointer is lower.

The display controller 14 can use change of the display mode of a pointer according to the system confidence level as described above, for changing the display mode of the pointer according to the cause of reduction of the system confidence level. The display controller 14 may set the type of the display mode changed according to the system confidence level and the type of the display mode changed according to the cause of reduction of the system confidence level to different types. More specifically, when the display controller 14 changes the color of the pointer according to the system confidence level, it may change the display mode of the pointer according to the cause of reduction of the system confidence level, by changing a feature (e.g., the shape of the pointer) other than the color.

When the cause of reduction of the system confidence level at a position corresponding to a pointer is a driving-mode switching induction factor, the display controller 14 may change the thickness or line width of the pointer so that the thickness or line width becomes larger than that in the case where the cause of reduction is not the driving-mode switching induction factor. When the cause of reduction of the system confidence level is a driving-mode switching induction factor or a driver intervention suggestion factor, the display controller 14 may blink the pointer. When the cause of reduction of the system confidence level is a driving-mode switching induction factor, the display controller 14 may increase the blinking speed of the pointer, such that the blinking speed becomes higher than that in the case where the cause of reduction of the system confidence level is a driver intervention suggestion factor.

When the cause of reduction of the system confidence level at a position corresponding to a pointer is a driving-mode switching induction factor, the display controller 14 may increase the size of the pointer, so that the size becomes larger than that in the case where the cause of reduction is not the driving-mode switching induction factor. When the cause of reduction of the system confidence level at a position corresponding to a pointer is a driving-mode switching induction factor or a driver intervention suggestion factor, the display controller 14 may display the pointer such that the pointer flickers. When the cause of reduction of the system confidence level at a position, corresponding to a pointer is the driving-mode switching induction factor, the display controller 14 may increase the amount of flickering of the pointer.

It is, however, to be noted that the type of the display mode changed according to the system confidence level and the type of the display mode changed according to the cause of reduction of the system confidence level are not necessarily required to be different from each other. The display controller 14 may divide a pointer into two or more sections, and make a color change for each section. For example, the display controller 14 may divide a pointer into an outline portion and a region inside the outline, and may change color of the region inside the outline according to the system confidence level, while it may change color of the outline portion according to the cause of reduction of the system confidence level.

Also, the display controller 14 may display a plurality of pointers, such that they respectively correspond to a plurality of positions that are spaced from each other at given intervals, using the vehicle V as a start point, on the course of the vehicle V. The positions spaced from each other at given intervals, using the vehicle V as a start point, on the course of the vehicle V may be obtained from the traveling plan. The given interval is not limited to any particular value, but may be set to 10 m, for example.

The display controller 14 may use only one of the driving-mode switching induction factor and the driver intervention suggestion factor, as a cause of reduction of the system confidence level. Also, the display controller 14 is not necessarily required to use the driving-mode switching induction factor or the driver intervention suggestion factor, as a cause of reduction of the system confidence level. The display controller 14 may pay attention to an extent to which the cause of reduction of the system confidence level is maintained, for example, and distinguish one cause from another, based on the extent.

More specifically, the display controller 14 determines whether the cause of reduction of the system confidence level is dynamic, or quasi-static, or static. The display controller 14 determines whether the cause of reduction of the system confidence level is dynamic, based on the relationship (such as the inter-vehicle distance) between the vehicle V and a preceding vehicle, the number of moving objects around the vehicle V, and the presence or absence of a pedestrian or pedestrians around the vehicle V, for example. The display controller 14 determines that the cause of reduction of the system confidence level is quasi-static, based on reduction of the sensor accuracy of the vehicle V, the shielding rate in the detection range of the external sensor 21 being equal to or larger than a first shielding threshold value, and entry of the vehicle V into a region where the map accuracy is low, for example. The display controller 14 determines that the cause of reduction of the system confidence level is static, when the reduction is caused by a road shape, such as an intersection, and a rail crossing, and the shielding rate in the detection range of the external sensor 21 is equal to or larger than a second shielding threshold value, for example. The second shielding threshold value is a set in advance to a value larger than the first shielding threshold value.

When the cause of reduction of the system confidence level at a position corresponding, to a pointer is dynamic, the display controller 14 may set the color saturation of the pointer to a higher value, than that in the case where the cause of reduction of the system confidence level is quasi-static or static. Also, when the cause of reduction of the system confidence level at a position corresponding to a pointer is quasi-static, the display controller 14 may set the color saturation of the pointer to a higher value, than that in the case where the cause of reduction of the system confidence level is static.

When the cause of reduction of the system confidence level at a position corresponding to a pointer is dynamic, the display controller 14 may change the shape of the pointer from an angular shape to a rounded shape, as compared with the case where the cause of reduction of the system confidence level is quasi-static or static. When the cause of reduction of the system confidence level at a position corresponding to a pointer is quasi-static, the display controller 14 may change the shape of the pointer from an angular shape to a rounded shape, as compared with the case where the cause of reduction of the system confidence level is static.

When the cause of reduction of the system confidence level at a position corresponding to a pointer is dynamic, the display controller 14 may set the blinking speed of the pointer to be faster than that in the case where the cause of reduction of the system confidence level is quasi-static or static. Similarly, when the cause of reduction of the system confidence level at a position corresponding to a pointer is quasi-static, the display controller 14 may set the blinking speed of the pointer to be faster than that in the case where the cause of reduction of the system confidence level is static.

The display controller 14 can project and display a plurality of pointers on the front windshield, such that the pointers correspond to a plurality of positions spaced at given intervals from the vehicle V on the course of the vehicle V as viewed from the driver, using a known technology of HUD display control. In the case shown in FIG. 2, the display controller 14 displays the pointer P1, such that it corresponds to a position spaced 10 meters apart from the vehicle V on the course of the vehicle V, for example. The display controller 14 displays the pointer P2, such that it corresponds to a position spaced 20 meters apart from the vehicle V on the course of the vehicle V. The display controller 14 displays the pointer P3, such that it corresponds to a position spaced 30 meters apart from the vehicle V on the course of the vehicle V. The display controller 14 displays the pointer P4, such that it corresponds to a position spaced 40 meters apart from the vehicle V on the course of the vehicle V. The display controller 14 displays the pointer P5, such that it corresponds to a position spaced 50 meters apart from the vehicle V on the course C of the vehicle V. The display controller 14 changes the display mode according to the system confidence level at the position to which each of the pointers P1-P5 corresponds.

When the system confidence level at a position or positions to which at least one of the pointers P1 to P5 corresponds is lower than the confidence level threshold value, the display controller 14 may change the display mode of all of the pointers P1 to P5 (for example, change the display mode to that of increased transparency). The display controller 14 may change the display mode of all of the pointers P1 to P5, according to the lowest system confidence level, among the system confidence levels at positions to which the pointers P1 to P5 correspond.

The display controller 14 is not necessarily required to individually associate the pointers with the system confidence levels at the corresponding positions (future posit ions) on the course C the vehicle V. The display controller 14 may change the display mode of all of the pointers according to the system confidence level of the vehicle V at the current position. Similarly, the display controller 14 may change the display mode of all of the pointers according to the cause of reduction of the system confidence level of the vehicle V at the current position. In this case, the system confidence level calculating unit 36 of the automatic driving system 2 need not calculate the future system confidence level. The display controller 14 may display the pointers such that the degree of transparency increases as the distance from the vehicle V to the pointer is larger. Also, the display controller 14 may display only one pointer all the time.

The on-board display 41 is not necessarily required to be HUD. For example, the on-board display 41 may be a multi-information display (MID). The MID is provided on an instrument panel of the vehicle V, for example. The on-board display 41 may be a vehicle-mounted display (e.g., a liquid crystal display used in a navigation system). The vehicle-mounted display is provided at a position where it can be viewed by the driver.

Figure 9:
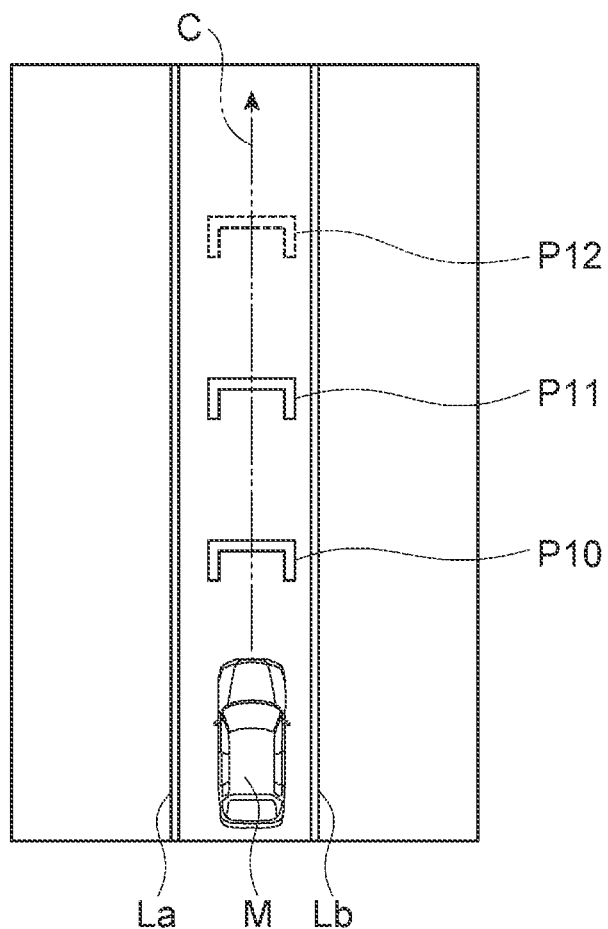
FIG. 9 is a view showing one example of change of the display mode of pointers on a Multi-Information Display (MID).

FIG. 9 shows one example of change of the display mode of pointers on the MID. FIG. 9 shows an own vehicle image M corresponding to the vehicle V, left-hand demarcation line image La, right-hand demarcation line image Lb, and pointers P10 to P12. The course C is provided, for indicating the relationship with the pointers P10 to P12, and need not be displayed on the MID.

The pointers P10, P11, P12 shown in FIG. 9 correspond to respective positions of the vehicle V on a traveling plan at a plurality of future times spaced at given time intervals, for example. The pointer P10 corresponds to a position of the vehicle V one second later on the traveling plan. The pointer P11 corresponds to a position of the vehicle V two seconds later on the traveling plan. The pointer P12 corresponds to a position of the vehicle V three seconds later on the traveling plan.

In a situation shown in FIG. 9, the pointer P12 is displayed in the display mode of increased transparency, due to reduction of the system confidence level. In this case, the background includes the left-hand demarcation line image La or right-hand demarcation line image Lb which any of the pointers P10 to P12 overlaps when the vehicle V makes a lane change, for example. In another example, the display controller 14 may employ a display mode of reduced luminance, rather than that of increased transparency, according to reduction of the system confidence level. Also, when the cause of reduction of the system confidence level is recognized by the cause recognizing unit 13, the display controller 14 changes the display mode of the pointers P10 to P12. Thus, the display device 1 can be appropriately utilized not only in the case where the on-board display 41 is the HUD, but also it is the MID or another vehicle-mounted display. Also, various embodiments and modified examples as described above may be applied.

The cause recognizing unit 13 of the display device 1 is not necessarily required to directly obtain information on the cause of reduction of the system confidence level, from the system confidence level calculating unit 36 of the automatic driving system 2. The cause recognizing unit 13 may recognize (specify) the cause of reduction of the system confidence level by itself, by obtaining the external environment of the vehicle V, prediction results of behavior of moving objects around the vehicle V, and so forth, as information obtained from the automatic driving system 2. In this case, the system confidence level calculating unit 36 does not need to specify the cause of reduction of the system confidence level.

Also, the display device 1 is not necessarily required to change the display mode of a pointer according to the cause of reduction of the system confidence level. In this case, the display device 1 need not have the cause recognizing unit 13. The automatic driving system 2 need not cause the system confidence level calculating unit 36 to specify the cause of reduction of the system confidence level.

A display device according to one aspect of the disclosure includes an electronic control unit configured to: obtain a traveling plan from an automatic driving system of a vehicle, the traveling plan including a course of the vehicle under automatic drive control of the automatic driving system; obtain, from the automatic driving system, a system confidence level of the automatic drive control calculated based on at least an external environment around the vehicle; and display, on a display, a pointer as an image indicating the course during the automatic drive control in a display mode set based on the system confidence level.

According to the above aspect, the display mode of the pointer as an image indicating the course during automatic drive control is changed according to the system confidence level obtained by the electronic control unit. Thus, it is possible to provide display that enables the driver to intuitively grasp the possibility of continuing automatic drive control, as compared with the case where the display mode of the pointer is not changed according to the system confidence level.

In the above aspect, the display may be a head-up display configured to project and display the pointer on a front windshield of the vehicle while superimposing the pointer on a landscape in front of the vehicle; and the electronic control unit may be configured to set a first degree of transparency of the pointer to be higher than a second degree of transparency of the pointer, the first degree of transparency of the pointer being a degree of transparency of the pointer in a case where the system confidence level is lower than a confidence level threshold value, and the second degree of transparency of the pointer being a degree of transparency of the pointer in a case where the system confidence level is equal to or higher than the confidence level threshold value, or set the degree of transparency of the pointer to be higher as the system confidence level is lower.

With the above arrangement, the head-up display (HUD) is used as the display for projecting and displaying the pointer on the front windshield of the vehicle while superimposing the pointer on a landscape in front of the vehicle. The use of the HUD enables the driver to visually recognize the pointer merely by looking forward of the vehicle, and makes it easy for the driver to grasp a change in the system confidence level, from a change of the display mode of the pointer. Also, the display device changes the degree of transparency of the pointer as change of the display mode of the pointer, such that the degree of transparency of the pointer in the case where the system confidence level is lower than the confidence level threshold value is higher than that in the case where the system confidence level is equal to or higher than the confidence level threshold value, or the degree of transparency of the pointer is increased as the system confidence level is lower. Since it becomes more difficult for the driver to see the pointer as the system confidence level is lower, the driver can intuitively grasp reduction of the possibility of continuing automatic drive control.

In the above aspect, the electronic control unit may be configured to display a plurality of the pointers on the display; and the pointers may respectively correspond to positions of the vehicle on the traveling plan at a plurality of future times at predetermined time intervals, the future times being set in advance.

In the above aspect, the electronic control unit may be configured to display a plurality of the pointers on the display; and positions where the pointers are displayed may be a plurality of positions of the vehicle on the course, the positions being spaced at predetermined intervals from the vehicle as a start point.

With the above arrangements, the pointers respectively correspond to a plurality of positions spaced at the predetermined intervals from the vehicle, or positions of the vehicle on the traveling plan at a plurality of future times. This makes it possible to change the display mode of each pointer according to the system confidence level for each position, so that the driver can grasp the possibility of continuing automatic drive control corresponding to the position on the course of the vehicle.

In the above aspect, the electronic control unit, maybe configured to: obtain information on a cause of reduction of the system confidence level from the automatic driving system, recognize the cause of reduction of the system confidence level based, on the information on the cause of reduction of the system confidence level when the system confidence level is less than a cause specification threshold value; and set the display mode of the pointer based on the system confidence level and the cause of reduction of the system confidence level when the system confidence level is less than the cause specification threshold value.

With the above arrangement, when the display mode of the pointer is changed due to reduction of the system confidence level, the display mode of the pointer is changed according to the cause of reduction of the system confidence level. Thus, the driver can grasp the cause of reduction of the system confidence level from the display mode of the pointer, and can more appropriately grasp the possibility of continuing automatic drive control.

In the above aspect, the system confidence level may be an index that indicates a reliability of the automatic drive control.

In the above aspect, the display mode of the pointer may include at least one of degree of transparency, luminance, color, shape, size, presence or absence of blinking, blinking speed, presence or absence of flickering, and flickering amount.

In the above aspect, the electronic control unit may be configured to display an arrival time in vicinity of the pointer on the display, the arrival time being a time when the vehicle arrives a position corresponding to the pointer.

What is claimed is:

1. A display device comprising an electronic control unit configured to:
   obtain a traveling plan from an automatic driving system of a vehicle, the traveling plan including a course of the vehicle under automatic drive control of the automatic driving system;
   obtain, from the automatic driving system, a system confidence level of the automatic drive control calculated based on at least an external environment around the vehicle; and
   display, on a display, a pointer as an image indicating the course during the automatic drive control in a display mode set based on the system confidence level.

2. The display device according to claim 1, wherein:
   the display is a head-up display configured to project and display the pointer on a front windshield of the vehicle while superimposing the pointer on a landscape in front of the vehicle; and
   the electronic control unit is configured to:
     set a first degree of transparency of the pointer to be higher than a second degree of transparency of the pointer, the first degree of transparency of the pointer being a degree of transparency of the pointer in a case where the system confidence level is lower than a confidence level threshold value, and the second degree of transparency of the pointer being a degree of transparency of the pointer in a case where the system confidence level is equal to or higher than the confidence level threshold value, or
     set a degree of transparency of the pointer to be higher as the system confidence level is lower.

3. The display device according to claim 1, wherein:
   the electronic control unit is configured to display a plurality of the pointers on the display; and
   the pointers respectively correspond to positions of the vehicle on the traveling plan at a plurality of future times at predetermined time intervals, the future times being set in advance.

4. The display device according to claim 1, wherein:
   the electronic control unit is configured to display a plurality of the pointers on the display; and
   positions where the pointers are displayed are a plurality of positions of the vehicle on the course, the positions being spaced at predetermined intervals from the vehicle as a start point.

5. The display device according to claim 1, wherein the electronic control unit is configured to:
   obtain information on a cause of reduction of the system confidence level from the automatic driving system;
   recognize the cause of reduction of the system confidence level based on the information on the cause of reduction of the system confidence level when the system confidence level is less than a cause specification threshold value; and
   set the display mode of the pointer based on the system confidence level and the cause of reduction of the system confidence level when the system confidence level is less than the cause specification threshold value.

6. The display device according to claim 1, wherein the system confidence level is an index that indicates a reliability of the automatic drive control.

7. The display device according to claim 1, wherein the display mode of the pointer includes at least one of degree of transparency, luminance, color, shape, size, presence or absence of blinking, blinking speed, presence or absence of flickering, and flickering amount.

8. The display device according to claim 1, wherein the electronic control unit is configured to display an arrival time in vicinity of the pointer on the display, the arrival time being a time when the vehicle arrives a position corresponding to the pointer.

9. A method comprising:
obtaining a traveling plan from an automatic driving system of a vehicle, the traveling plan including a course of the vehicle under automatic drive control of the automatic driving system;
obtaining, from the automatic driving system, a system confidence level of the automatic drive control calculated based on at least an external environment around the vehicle; and
displaying, on a display, a pointer as an image indicating the course during the automatic drive control in a display mode set based on the system confidence level.

10. The method of claim 9, wherein the display is a head-up display configured to project and display the pointer on a front windshield of the vehicle while superimposing the pointer on a landscape in front of the vehicle, the method further comprising:
setting a first degree of transparency of the pointer to be higher than a second degree of transparency of the pointer, the first degree of transparency of the pointer being a degree of transparency of the pointer in a case where the system confidence level is lower than a confidence level threshold value, and the second degree of transparency of the pointer being a degree of transparency of the pointer in a case where the system confidence level is equal to or higher than the confidence level threshold value, or
setting a degree of transparency of the pointer to be higher as the system confidence level is lower.

11. The method of claim 9, further comprising displaying a plurality of the pointers on the display, wherein the pointers respectively correspond to positions of the vehicle on the traveling plan at a plurality of future times at predetermined time intervals, the plurality of future times being set in advance.

12. The method of claim 9, further comprising displaying a plurality of the pointers on the display, wherein positions where the pointers are displayed are a plurality of positions of the vehicle on the course, the positions being spaced at predetermined intervals from the vehicle as a start point.

13. The method of claim 9, further comprising:
obtaining information on a cause of reduction of the system confidence level from the automatic driving system;
recognizing the cause of reduction of the system confidence level based on the information on the cause of reduction of the system confidence level when the system confidence level is less than a cause specification threshold value; and
setting the display mode of the pointer based on the system confidence level and the cause of reduction of the system confidence level when the system confidence level is less than the cause specification threshold value.

14. The method of claim 9, wherein the system confidence level is an index that indicates a reliability of the automatic drive control.

15. The method of claim 9, wherein the display mode of the pointer includes at least one of degree of transparency, luminance, color, shape, size, presence or absence of blinking, blinking speed, presence or absence of flickering, and flickering amount.

16. The method of claim 9, further comprising displaying an arrival time in vicinity of the pointer on the display, the arrival time being a time when the vehicle arrives a position corresponding to the pointer.

* * * * *